(12) United States Patent
Waller

(10) Patent No.: US 8,119,911 B1
(45) Date of Patent: Feb. 21, 2012

(54) COVER PLATE FOR ELECTRICAL ENCLOSURE BOX AND ASSOCIATED METHOD

(76) Inventor: William Waller, Yorba Linda, CA (US)

( * ) Notice: Subject to any disclaimer, the term of this patent is extended or adjusted under 35 U.S.C. 154(b) by 461 days.

(21) Appl. No.: 12/321,058

(22) Filed: Jan. 15, 2009

Related U.S. Application Data

(60) Provisional application No. 61/062,087, filed on Jan. 24, 2008.

(51) Int. Cl.
*H02G 3/14* (2006.01)

(52) U.S. Cl. ............ 174/66; 174/67; 220/241; 220/242; 33/528; 33/DIG. 10

(58) Field of Classification Search ............ 174/66, 174/67, 53, 50, 58, 57, 480, 481; 220/3.2–3.9, 220/4.02, 241, 242; 33/562, 528, DIG. 10; D13/173, 156
See application file for complete search history.

(56) References Cited

U.S. PATENT DOCUMENTS

| | | | |
|---|---|---|---|
| 4,907,711 A | 3/1990 | Stuchlik, III | |
| 4,953,733 A * | 9/1990 | Loscuito | 220/3.8 |
| 5,526,952 A | 6/1996 | Green | |
| 6,653,566 B2 * | 11/2003 | Petak et al. | 174/66 |
| 6,867,370 B2 | 3/2005 | Compagnone, Jr. | |
| 7,442,874 B2 * | 10/2008 | Compagnone, Jr. | 174/66 |
| 7,456,359 B1 * | 11/2008 | Tidd | 174/66 |
| 7,935,887 B2 * | 5/2011 | Petak | 174/66 |

* cited by examiner

*Primary Examiner* — Angel R Estrada

(57) ABSTRACT

An electrical connection enclosure cover plate for use during drywall installation, texturing and painting processes, may include a single and unitary body having a rectangular and planar outer wall adapted to be affixed to an existing electrical box. The outer wall has a plurality of pins extending outwardly from an anterior face thereof. The pins are statically situated at opposed corners of the anterior face, and suitably sized and shaped to penetrate through an existing dry wall. The body has a plurality of primary panels directly connected to a posterior face of the outer wall. The primary panels may be adapted to frictionally engage the existing electrical box. The body may be adapted to be detachably coupled to the existing electrical box such that the outer wall may be adapted to cover and shield a front opening of the existing electrical box from undesirable debris and fluids.

11 Claims, 51 Drawing Sheets

COVER PLATE FOR ELECTRICAL ENCLOSURE BOX AND ASSOCIATED METHOD

CROSS REFERENCE TO RELATED APPLICATIONS

This application claims the benefit of U.S. Provisional Application No. 61/062,087, filed Jan. 24, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to protective coverings for electrical enclosure boxes and, more particularly, to a removable electrical connection enclosure cover plate for use during drywall installation, texturing and painting processes.

2. Prior Art

All electrical connections must be housed in closed electrical boxes. Boxes also hold switches, lights and receptacles securely in place while providing access for future service. There are several different shapes in place plastic and metal, and each type has a specific use. The metal handy box is a formed, one-piece box that is intended for external mounting and is designed to be used with armored cable or conduit. The boxes have circular knockouts on all sides to accommodate conduit connector fittings. In the average home, you may find these boxes used to handle furnace wiring, or to house receptacles and switches mounted on concrete walls. Because all metal boxes must be grounded, each has a tapped hole in the back for a grounding screw.

Another type of metal box is the switch box which is used mostly in retrofit situations in older houses. This box is made up of separate panels, and some models are gangable—they can be doubled or tripled in width by removing a side panel and adding boxes. Switch boxes are typically nailed to studs with nails but similar models are available with plaster flanges and side-mount clips. These variations allow you to install a new box into a plaster wall without securing it to the stud. Box size is an important consideration because building codes limit the number of wires stamped on the back of the box but it pays to check with local. Generally, each hot or neutral wire counts as one, the device, switch or receptacle counts as two, and all ground wires count as one.

Boxes range in depth from about one and a half to three and a half inches with two and a half inch boxes being the most common. Whenever possible, use full-depth boxes. Even if you don't need the added capacity, larger boxes are easier to wire and allow you to expand later. Larger boxes are also required when you need two or more switches or receptacles installed in the same box to accommodate 2, 3, and 4 gang boxes. A problem that is frequently encountered by electricians after electrical boxes are installed is that another tradesman, usually a drywall or stucco contractor, has inadvertently covered the box with a drywall panel or stucco. This of course requires extra work to correct the problem and wires can be damaged by drywall mud.

U.S. Pat. No. 6,867,369 to Wiggins discloses a temporary protective cover/guide for a universal electrical/communications box. The protective cover having a perimeter side wall, a recessed planar base, and a flange extending outwardly from the side wall such that it is preferably substantially planar and parallel to the planar base. Unfortunately, such a prior art reference does not permit a user to attach the cover plate over the electrical connection enclosure box after the electrical devices have been attached to the electrical wiring inside the connection box. The present invention overcomes such a shortcoming by providing a versatile cover plate that can be inserted into the enclosure box before and after the electrical devices have been connected to the wiring and the enclosure box, respectively.

U.S. Pat. No. 4,907,711 to Stuchlik discloses a protective cover for electrical outlet boxes and the like which prevents the outlet box from being covered during installation of drywall and prevents entry of debris into the outlet box while permitting the interior of the outlet box to be readily accessible. Unfortunately, as shown in FIGS. 1, 2, 3a, 3b, 4, 5a, 5b, 6 and 7, this prior art reference cannot be installed over electrical devices (plugs and switches). Also, the locator points at each corner stick out too far and the drywall installers would just remove the cover. To overcome such a shortcoming, the present invention can be installed over electrical devices (plugs and switches) and used during the painting process to protect the installed devices (plugs and switches). The pins of the present invention are designed not to not stick out too far so the drywall installer will not need to remove the cover and these points mark the drywall to ensure a perfect cut each time around all electrical enclosure boxes.

U.S. Pat. No. 5,526,952 to Green discloses a temporary protective cover for electrical outlet boxes and the like which prevents the boxes from being covered with wall material during installation, prevents paint and plaster from entering the boxes during finishing operations, and also prevents electrical shock from contact with exposed wires. Unfortunately, this prior art reference does not disclose a method for alerting contractors where an electrical box has been installed so a hole can later be cut in the dry wall to allow access to the box. Further, this prior art reference employs a single gang embodiment that cannot be installed over electrical devices (plugs and switches). The location points at each corner are not sharp enough to mark the drywall. The cover would stick out past the drywall so the drywall installer would remove the cover to make their job easier. The present invention overcomes such shortcomings by being designed to install over electrical devices (plugs and switches) as well as being used during the painting process to protect the installed devices (plugs and switches). As noted below, the pins of the present invention are suitably sized and shaped to not stick out too far so the drywall installer will not need to remove the cover and these points mark the drywall to ensure a perfect cut each time around all electrical enclosure boxes.

U.S. Pat. No. 6,867,370 to Compagnone Jr. discloses a variety of temporary protective covers for an electrical box having an open front end. Unfortunately, this prior art reference has a variety of shortcomings as explained hereinbelow. For example, referring to FIGS. 1, 12 and 13, this prior art reference discloses a single gang cover that cannot be installed over the electrical box when an electrical device (plugs or switches) is installed because the face of the cover is recessed inward. Also, this prior art reference has a tab that sticks out and this tab would be in the way of drywall installers so the cover would need to be removed. Further, this prior art reference does not have location points at the corners. In contrast, the present invention can be installed over electrical devices (plugs and switches) and may further be used during the painting process to protect the installed devices (plugs and switches). The present invention also includes points (pins) at each corner for marking the drywall. Such marks ensure a perfect cut each time around all electrical enclosure boxes. The present invention also will not interfere with a router, which is often employed by a drywall installer.

Further, as shown in FIGS. 24 and 25, this prior art reference employs a tab 247. Unfortunately, such a tab sticks out too far and would get in the way for drywall installation so the drywall installers would need to remove the cover to install the drywall. The present invention solves this problem by employing a point at each corner for marking the drywall. This mark ensures a perfect cut each time around all electrical enclosure boxes.

Now referring to FIGS. 24 and 25 of the prior art reference, sides 219-1 and 219-2 will not seal off live electrical wires. To overcome such a prior art shortcoming, the present invention is a press fit so that it covers the live electrical wiring and shields same from user contact.

Now referring to FIGS. 32 and 32A of the prior art reference, it can be seen that the tab sticks out too far and it would be in the way of the drywall installers. Further, such an embodiment of the prior art reference does not have location points at the corners. To overcome this shortcoming, the present invention eliminates the need for a tab that sticks out, which would be in the way of drywall installation and also has location points to ensure a perfect cut each time.

Now referring to FIGS. 34-41 of the prior art reference, the two gang embodiment cannot be installed over the electrical box when an electrical device (plugs or switches) is installed because the face of the cover is recessed inward. Also, the tab sticks out too far and it would be in the way of the drywall installers.

Similar to the other embodiments, such an embodiment does not have location points at the corners. To overcome such a shortcoming, the present invention is designed to be installed over electrical devices (plugs and switches). Further, the present invention can be used during the painting process to protect the installed devices (plugs and switches).

Accordingly, a need remains for an electrical connection enclosure cover plate in order to overcome the above-noted shortcomings. The present invention satisfies such a need by providing a device that is convenient and easy to use, is durable yet lightweight in design, is versatile in its applications, and provides for use during drywall installation, texturing and painting processes.

BRIEF SUMMARY OF THE INVENTION

In view of the foregoing background, it is therefore an object of the present invention to provide an apparatus for use during drywall installation, texturing and painting processes. These and other objects, features, and advantages of the invention are provided by an electrical connection enclosure cover plate.

An electrical connection enclosure cover plate for use during drywall installation, texturing and painting processes, may include a single and unitary body preferably having a substantially rectangular and planar outer wall adapted to be affixed to an existing electrical connection enclosure box. The outer wall preferably has a plurality of pins extending outwardly from an anterior face thereof. The pins may be statically situated at opposed corners of the anterior face, and further may be suitably sized and shaped to penetrate through an existing dry wall. The body further preferably has a plurality of primary panels directly connected to a posterior face of the outer wall. The primary panels may extend rearwardly and away from the posterior face.

The primary panels may further be adapted to frictionally engage the existing electrical connection enclosure box; wherein the outer wall is provided with at least one opening formed therein for assisting a user to remove the body from the existing electrical connection enclosure box. The body may be adapted to be detachably coupled to the existing electrical connection enclosure box such that the outer wall may be adapted to cover and shield a front opening of the existing electrical connection enclosure box from undesirable debris and fluids.

The primary panels may be registered orthogonally to the posterior face of the outer wall. The outer wall preferably has oppositely situated rectilinear edges registered parallel to longitudinal lengths of the primary panels respectively, such that the primary panels extend along a major longitudinal length of the rectilinear edges.

The body further includes a plurality of auxiliary panels directly connected to the posterior face of the outer wall, such that the auxiliary panels extend rearwardly therefrom. The auxiliary panels are registered orthogonally to the posterior face and remain intermediately positioned between the primary panels respectively. A plurality of arcuately shaped members may be directly connected to axially opposed ends of the primary panels respectively for increasing a surface area against which the body is adapted to frictional engage the existing electrical connection enclosure box.

The auxiliary panels may have a curvilinear and oscillating shape configured in such a manner that the auxiliary panels further may have axially opposed lateral ends directly coupled to the arcuately shaped members, and thereby define a continuous frame inwardly along an outer perimeter of the posterior face. The arcuately shaped members are intermediately situated between the primary and auxiliary panels respectively, such that the arcuate shaped members define opposing corners of the frame. The auxiliary panels are spaced apart along the rectilinear edges of the outer wall and further remain statically coupled to the posterior face of the outer wall.

The present invention may further include a method for shielding an existing electrical connection enclosure box during drywall installation, texturing and painting processes. Such a method may include the chronological steps of first attaching the existing electrical enclosure box to a support surface. A second step of the method may include providing a single and unitary body preferably having a substantially rectangular and planar outer wall. The outer wall preferably has a plurality of coextensively shaped pins extending outwardly from an anterior face thereof.

The pins may be statically situated at opposed corners of the anterior face. The body may further have a plurality of primary panels directly connected to a posterior face of the outer wall. The primary panels may extend rearwardly and away from the posterior face. The outer wall may be provided with at least one opening formed therein.

A third step in the method may include detachably coupling the body to the existing electrical connection enclosure box. This can be accomplished by frictionally engaging the primary panels to an interior surface of the existing electrical connection enclosure box so that the outer wall covers an entire front opening of the existing electrical enclosure box. This shields the front opening of the existing electrical connection enclosure box from undesirable debris and fluids.

A fourth step of the method may include providing and connecting a dry wall section to the support surface such that a posterior face of the drywall section abuts the pins. Fifthly, the user may use the pins to penetrate the posterior face of the dry wall section by firmly pressing the dry wall section rearwardly towards the pins and the electrical connection enclosure box respectively.

A sixth step of the method may be identifying a perimeter of the existing electrical connection enclosure box by drawing a plurality of linear lines between the pins on the drywall section. Seventh, the user may remove a cutout portion of the drywall section that covers the outer wall by cutting the drywall section along the linear lines. The eighth step of the method may include texturing and painting a remaining portion of the drywall section. Lastly, the user may detach the body from the existing electrical connection enclosure box by forwardly pulling the outer wall through the cutout portion of the drywall section.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which'

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
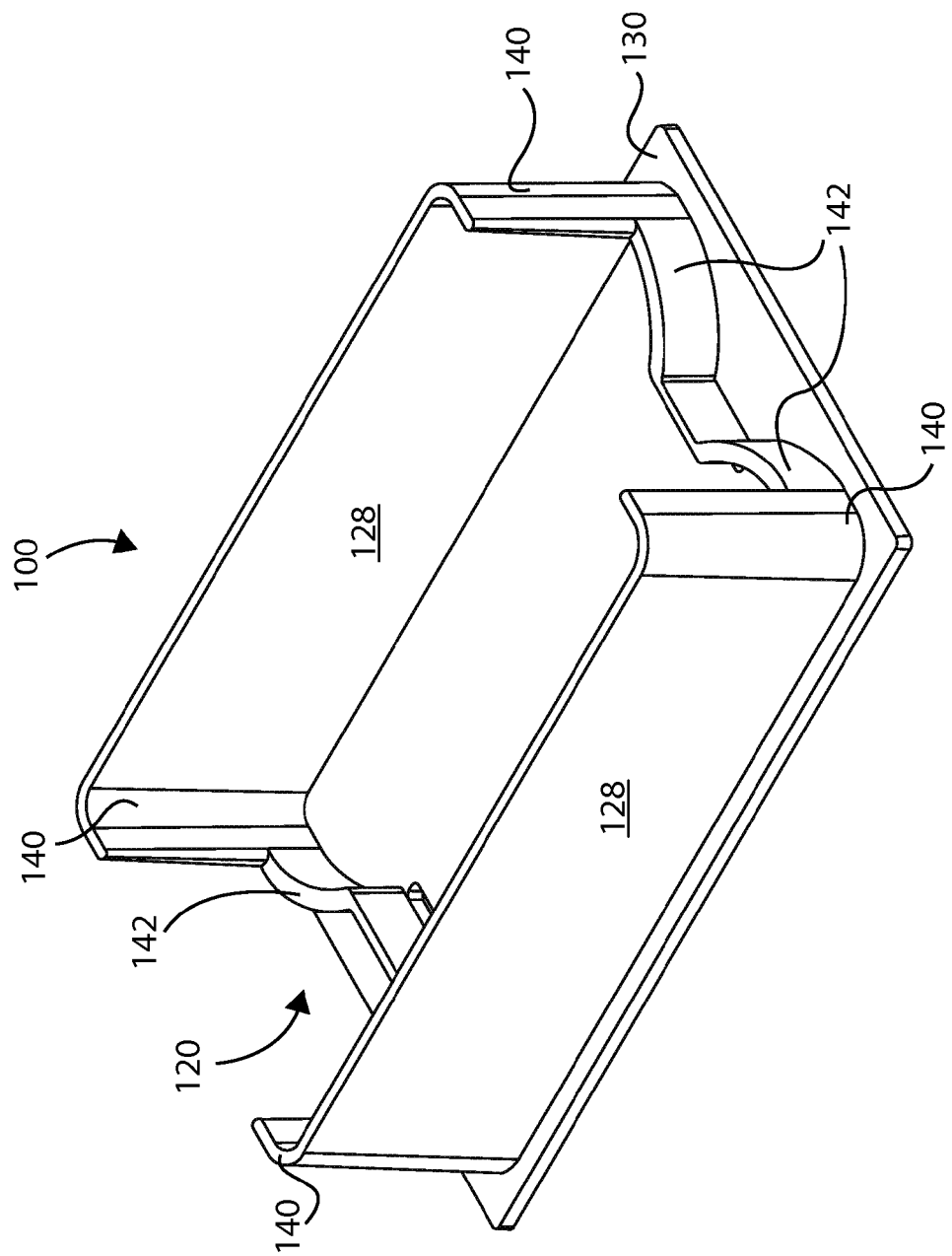
FIG. 1 is a perspective view showing a protective cover plate, in accordance with one embodiment of the present invention.
Figure 2:
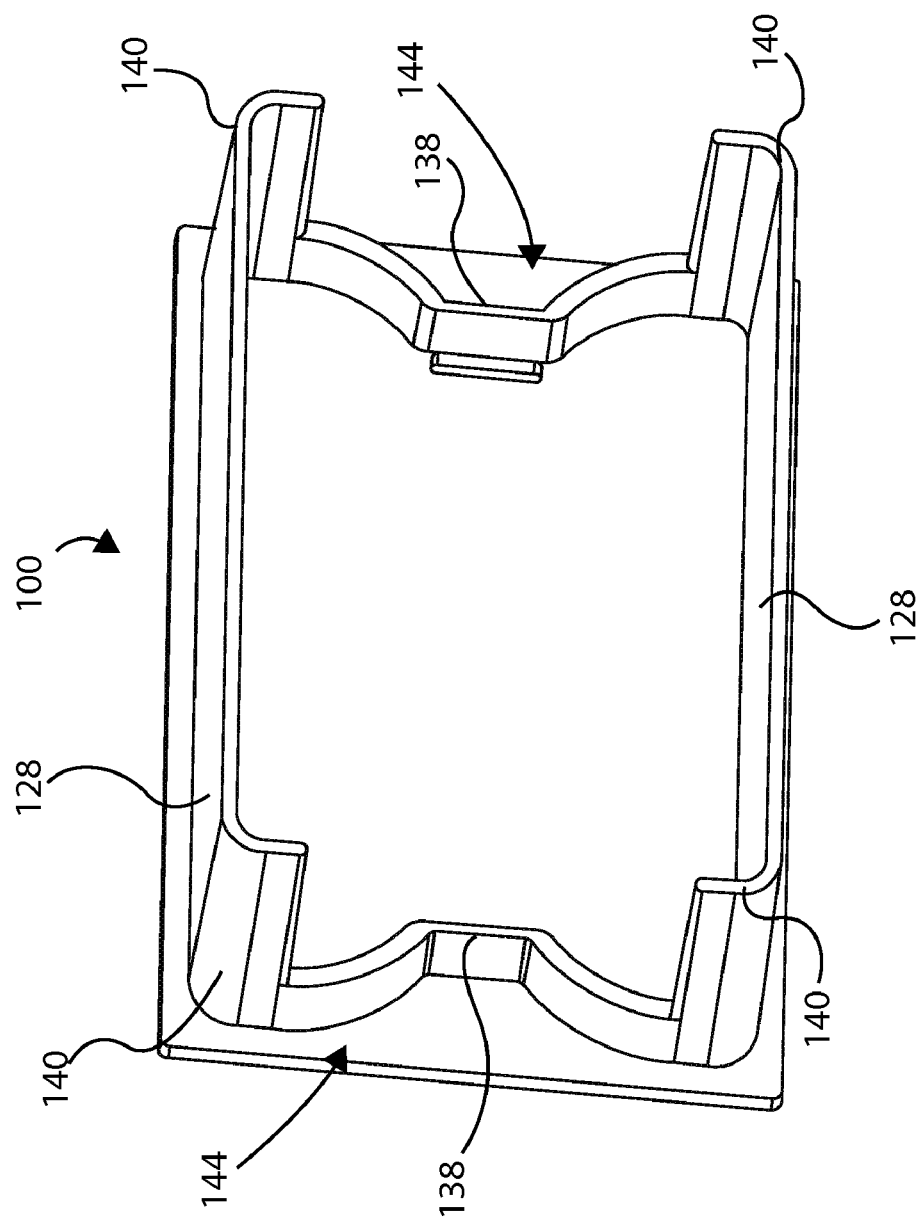
FIG. 2 is another perspective view of the cover plate shown in FIG. 1.
Figure 3:
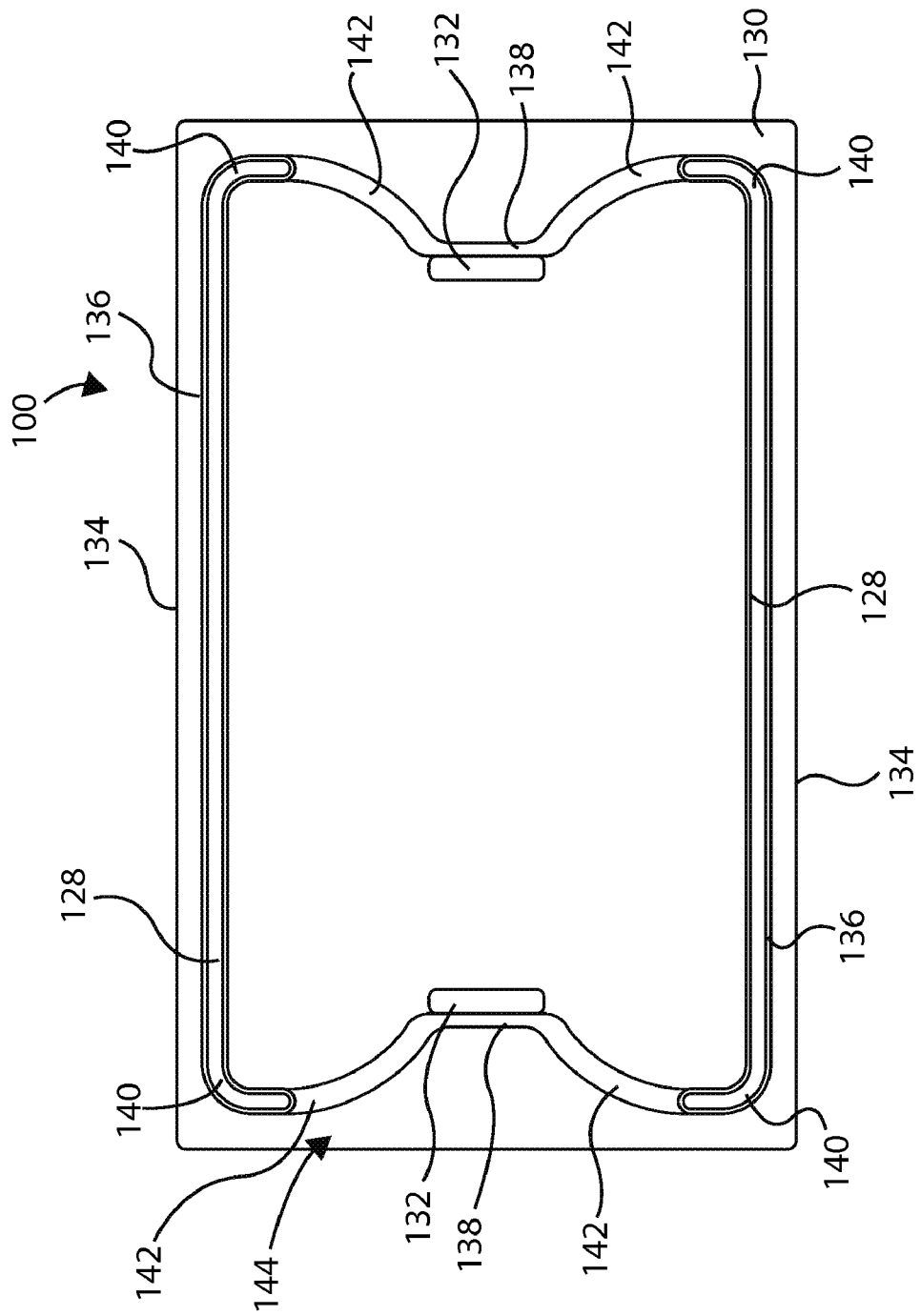
FIG. 3 is an enlarged top plan view of FIG. 1.
Figure 4:
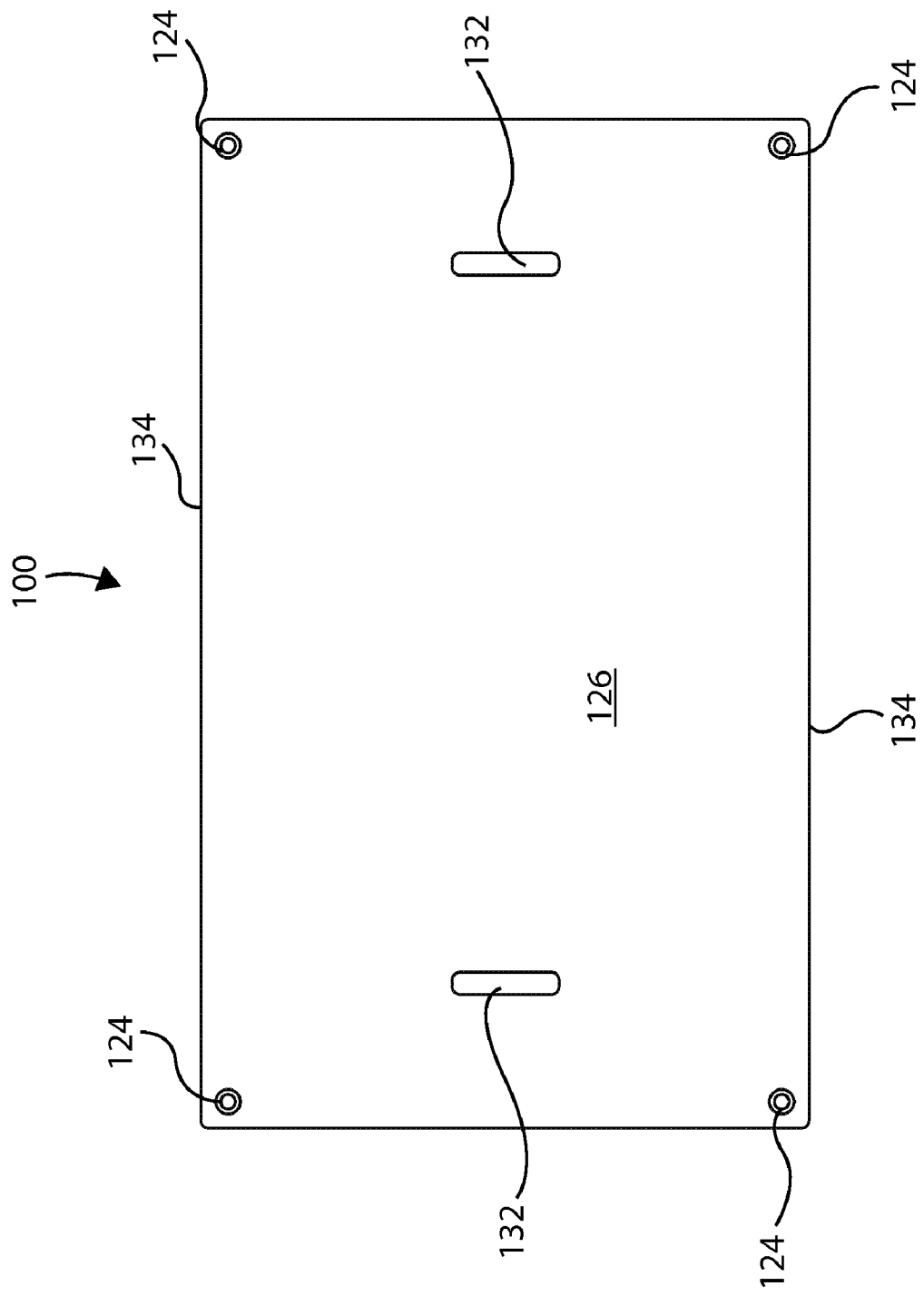
FIG. 4 is a bottom plan view of FIG. 3.
Figure 5:
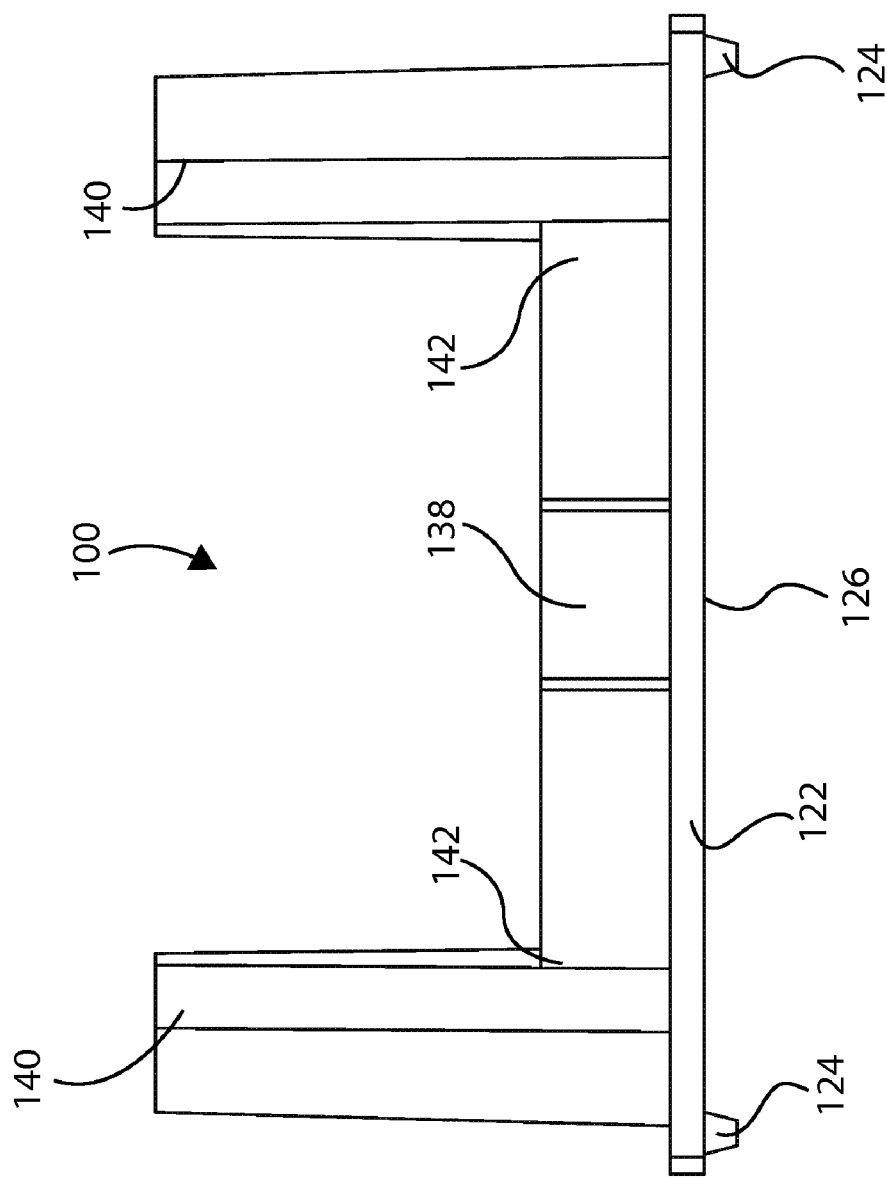
FIG. 5 is an enlarged front elevational view of FIG. 3.
Figure 6:
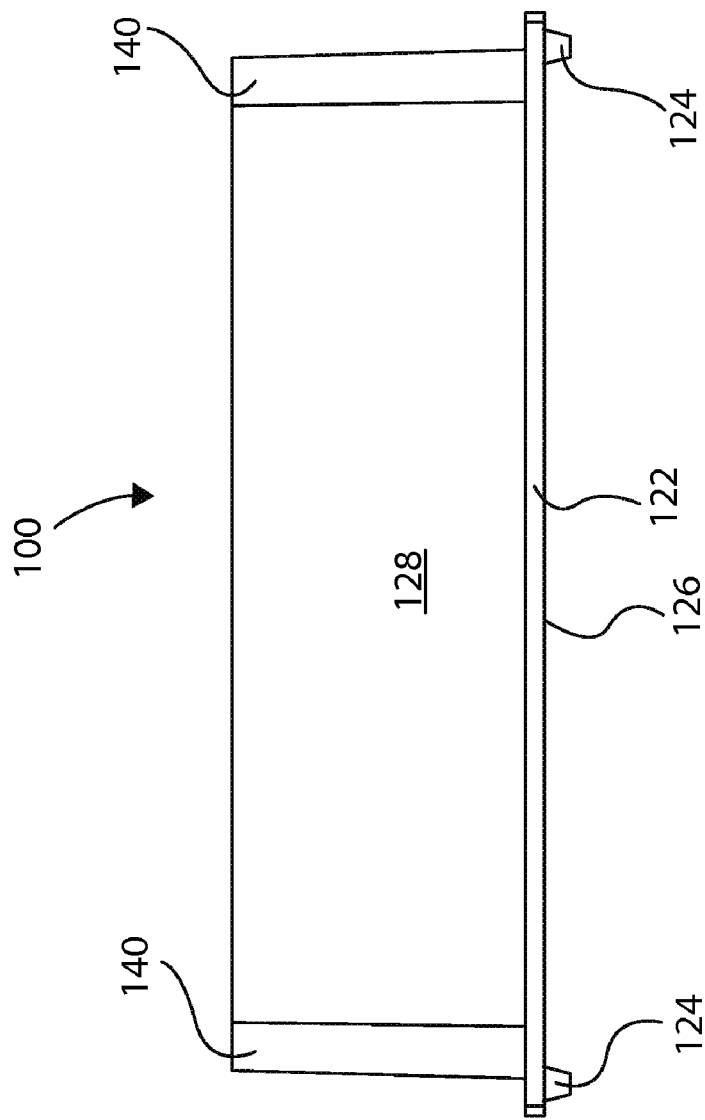
FIG. 6 is a left side elevational view of FIG. 5.
Figure 7:
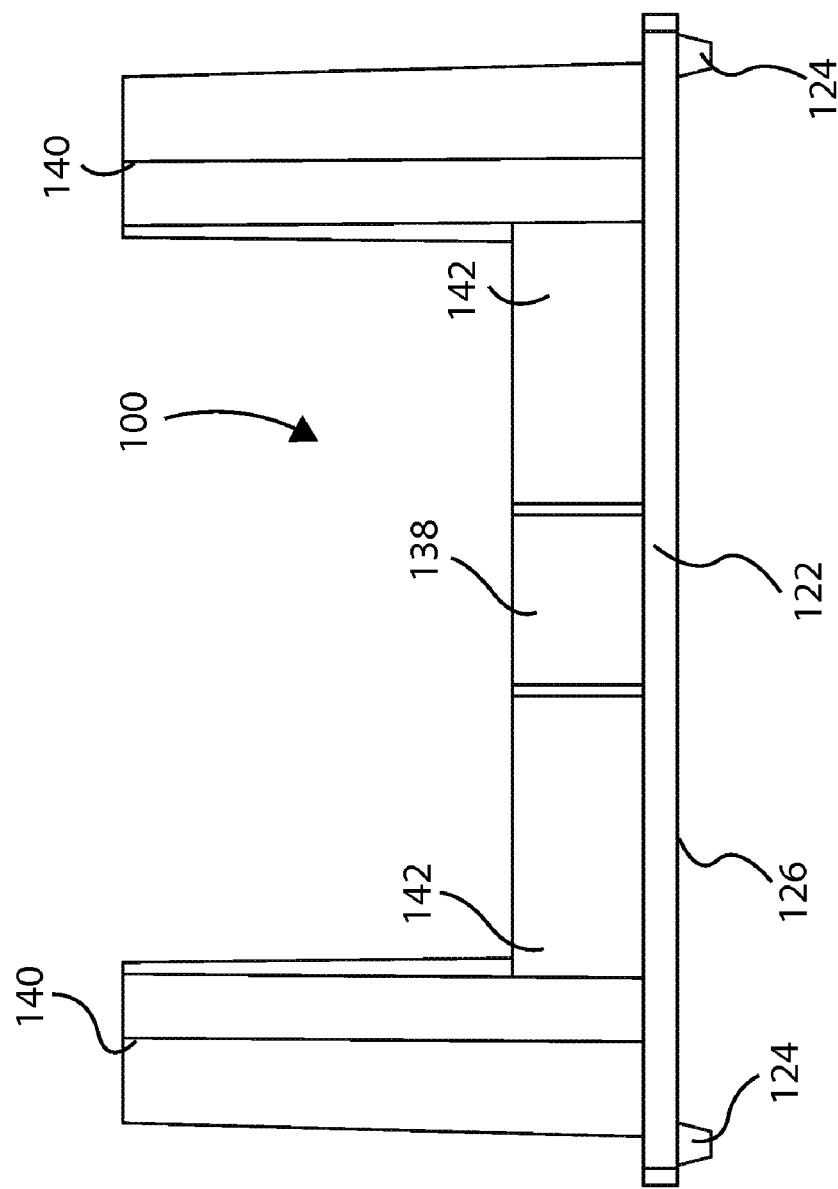
FIG. 7 is rear elevational view of FIG. 5.
Figure 8:
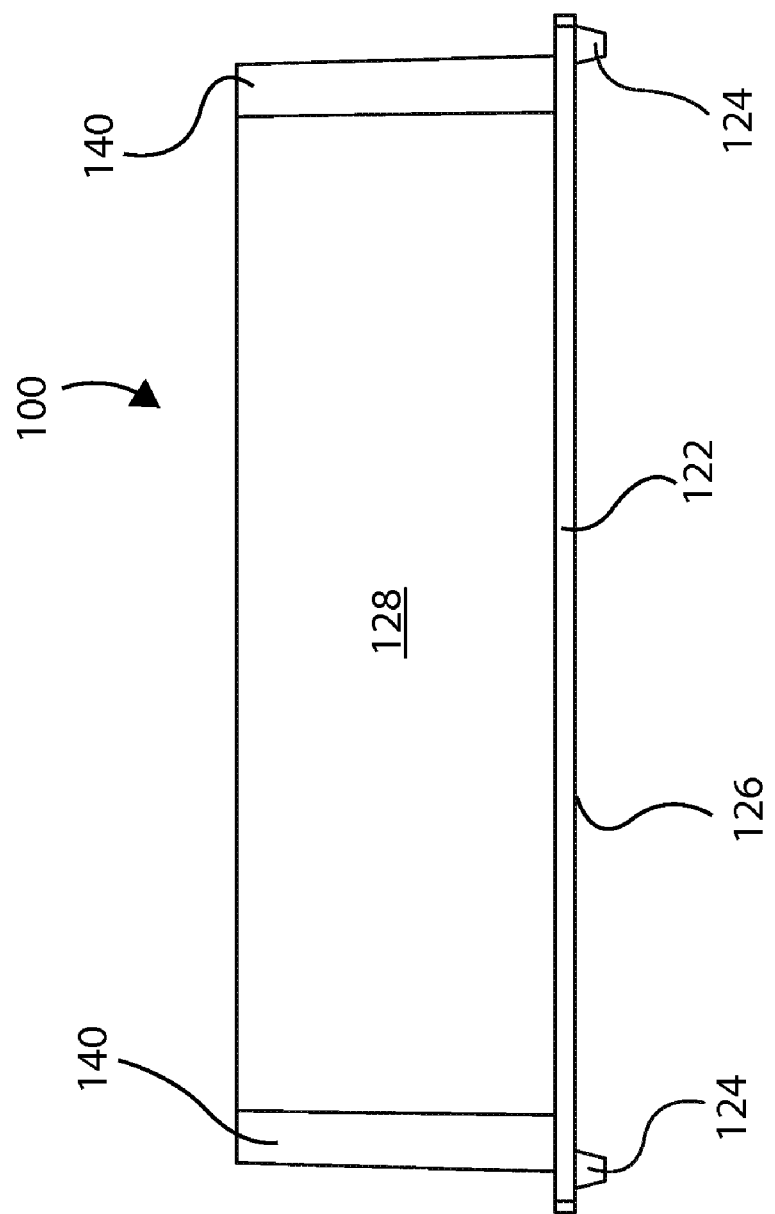
FIG. 8 is a right side elevational view of FIG. 5.
Figure 9:
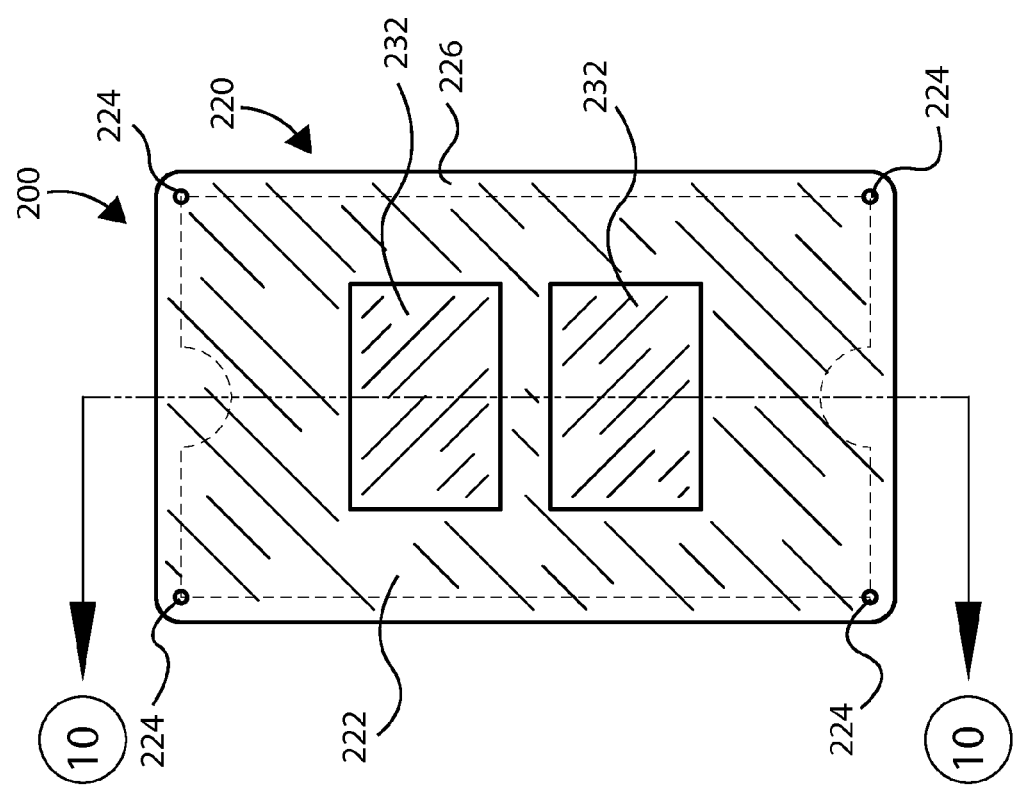
FIG. 9 is a top plan view showing a second embodiment of the present invention with portions.
Figure 10:
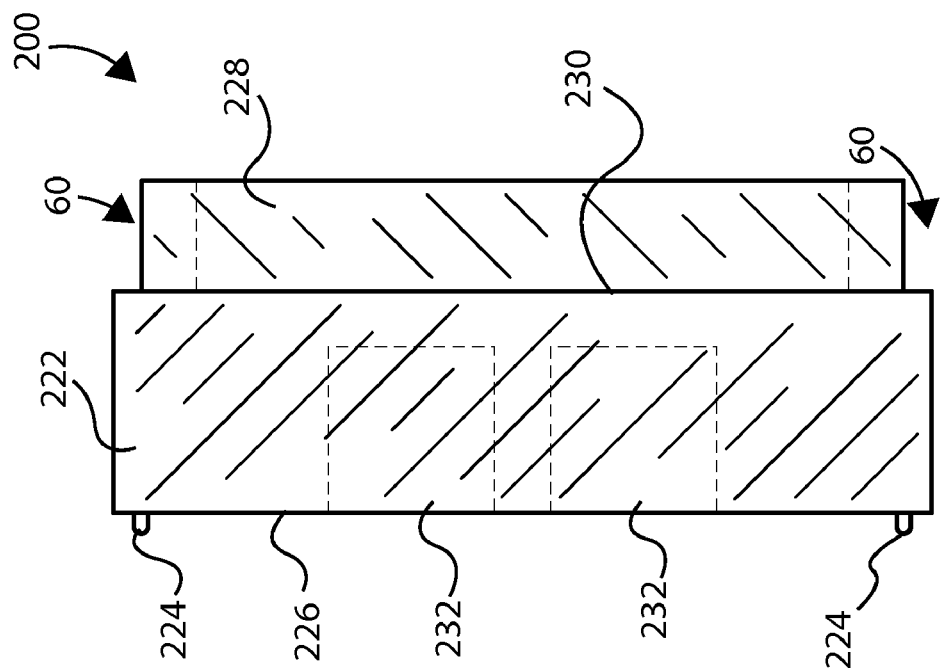
FIG. 10 is a cross-sectional view of FIG. 9 taken along line 1-10.
Figure 11:
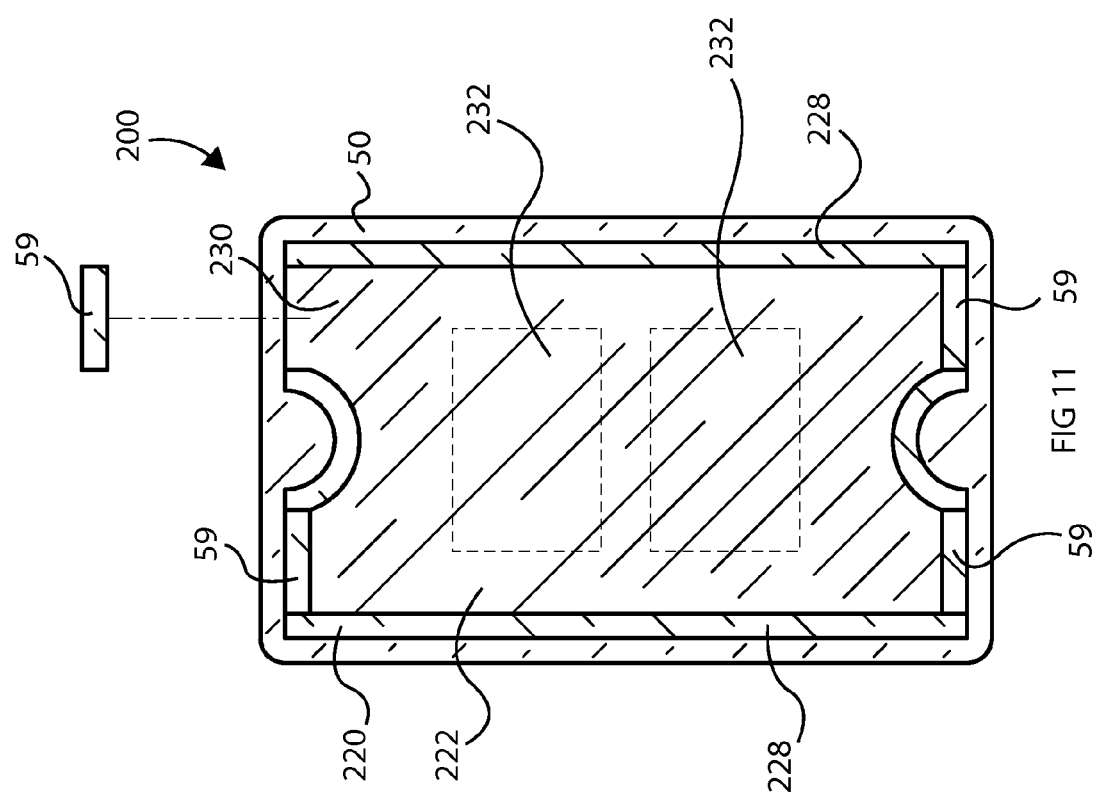
FIG. 11 is a bottom plan view of FIG. 9 showing a removable portion.
Figure 12:
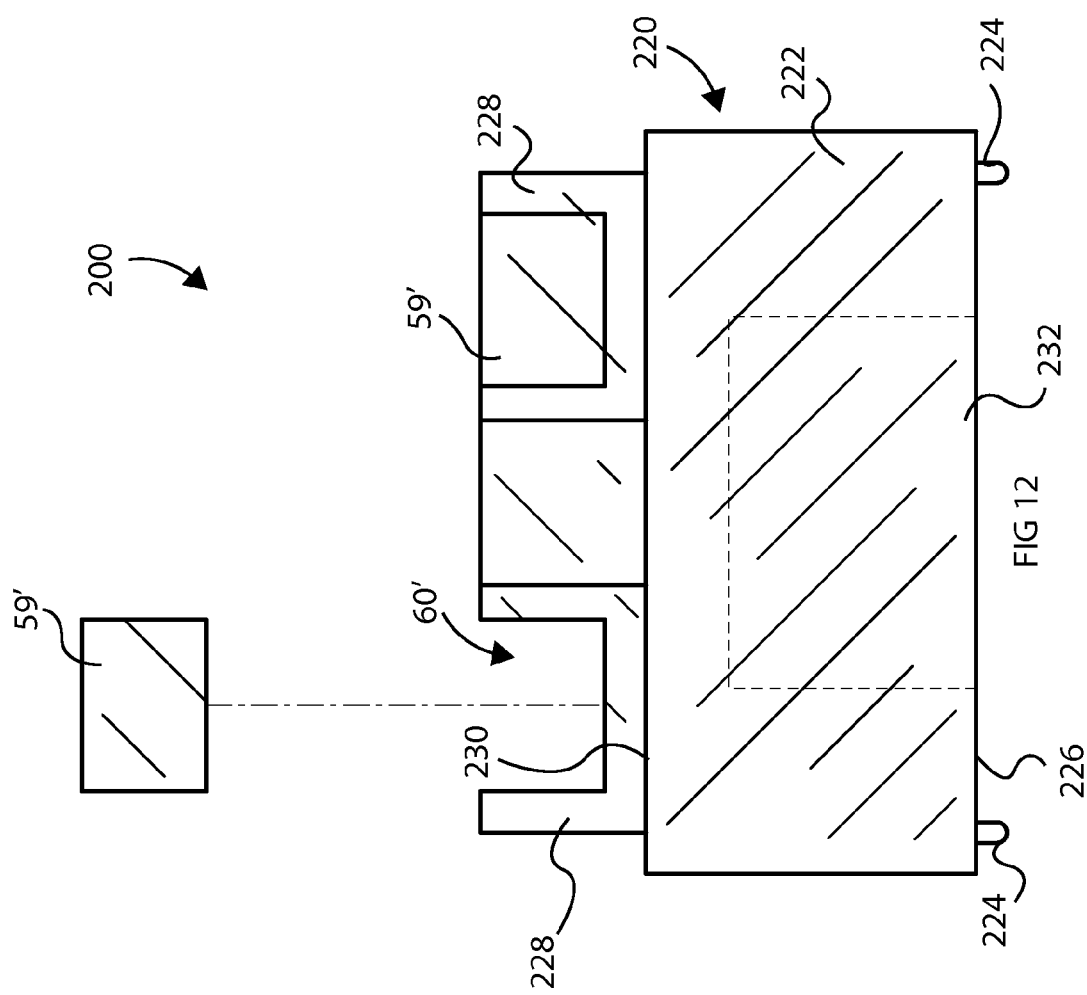
FIG. 12 is a front elevational view showing another removable portion.
Figure 13:
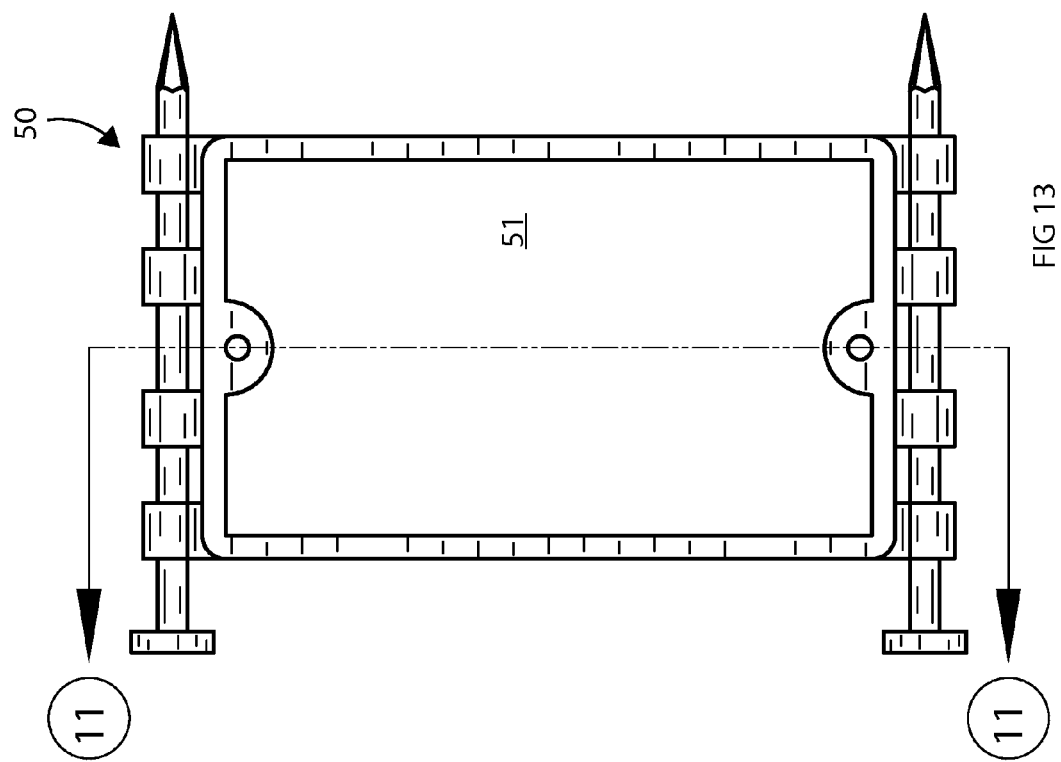
FIG. 13 is a front elevational view showing an exemplary electrical connection enclosure box, including built-in fastening members.
Figure 14:
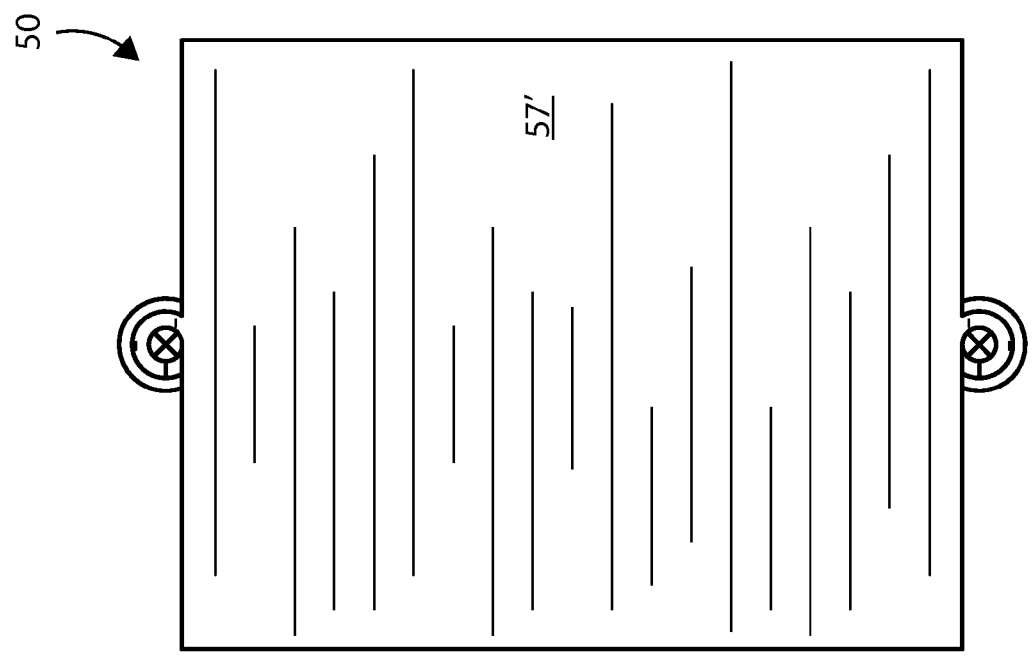
FIG. 14 is a rear elevational view of FIG. 13.
Figure 15:
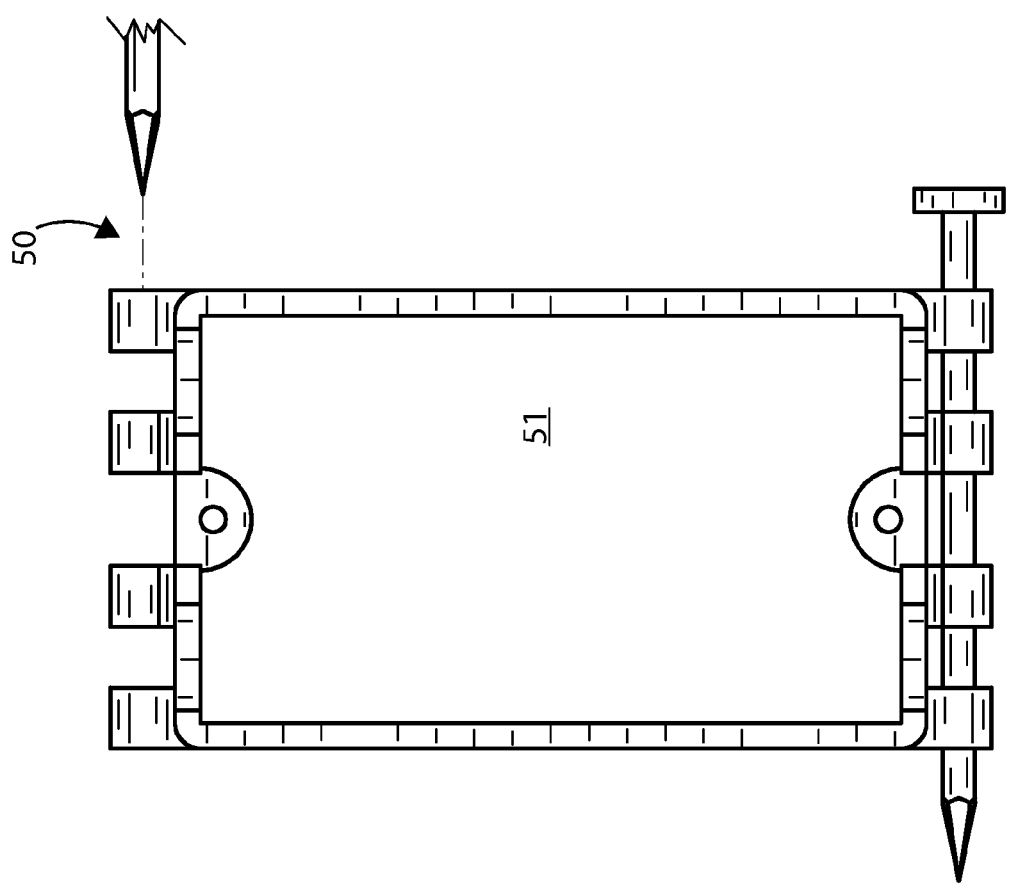
FIG. 15 is a front elevational view of FIG. 13 showing displacement of a fastening member.
Figure 16:
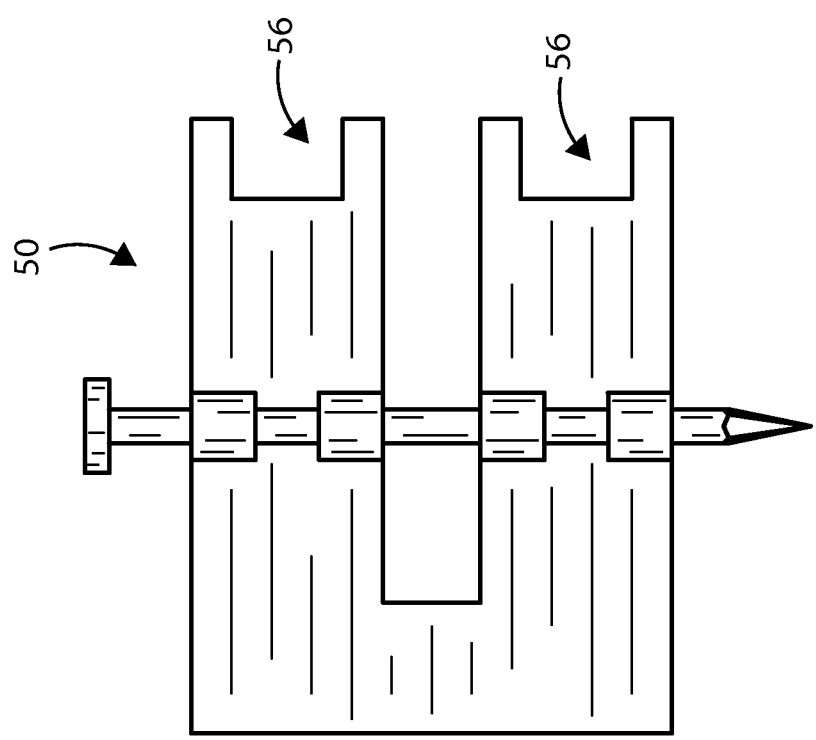
FIG. 16 is a top plan view of FIG. 13.
Figure 17:
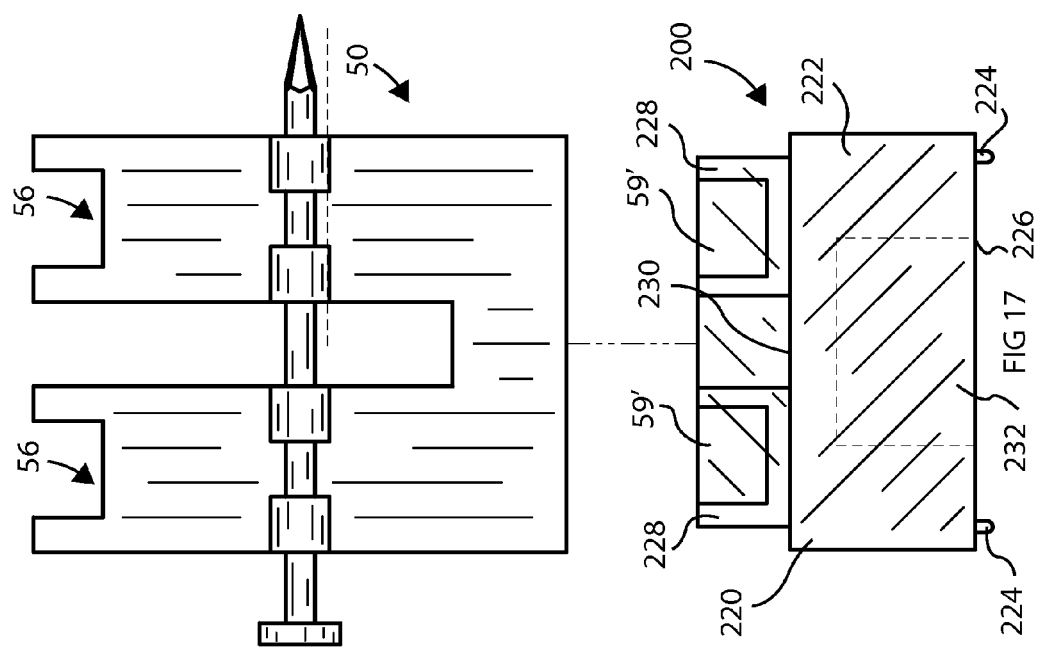
FIG. 17 is a top plan view showing the second embodiment removably engaged with the electrical connection enclosure box of FIG. 13.
Figure 18:
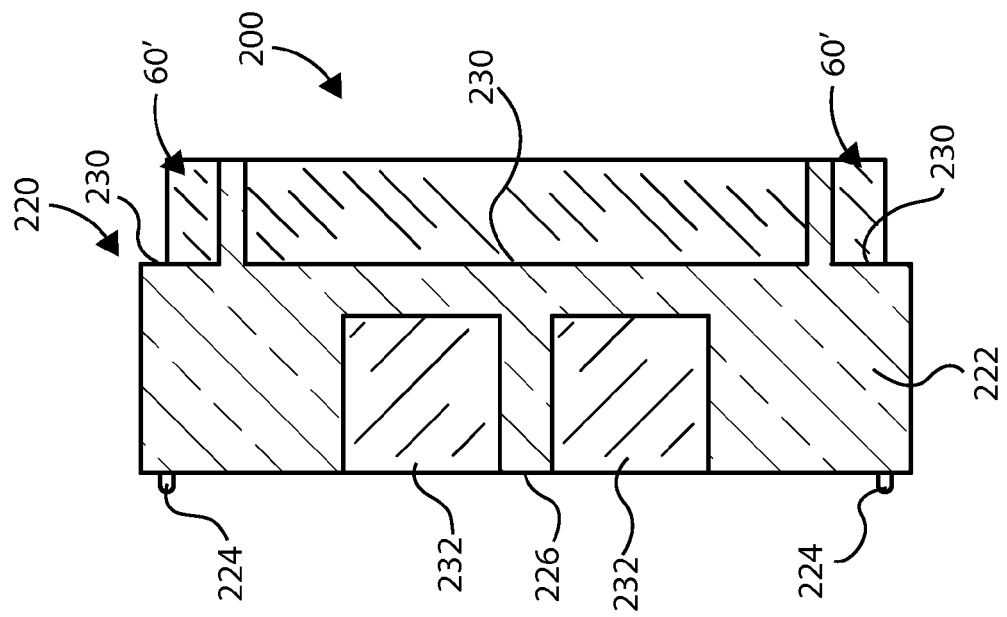
FIG. 18 is a side elevational view of FIG. 13.
Figure 19:
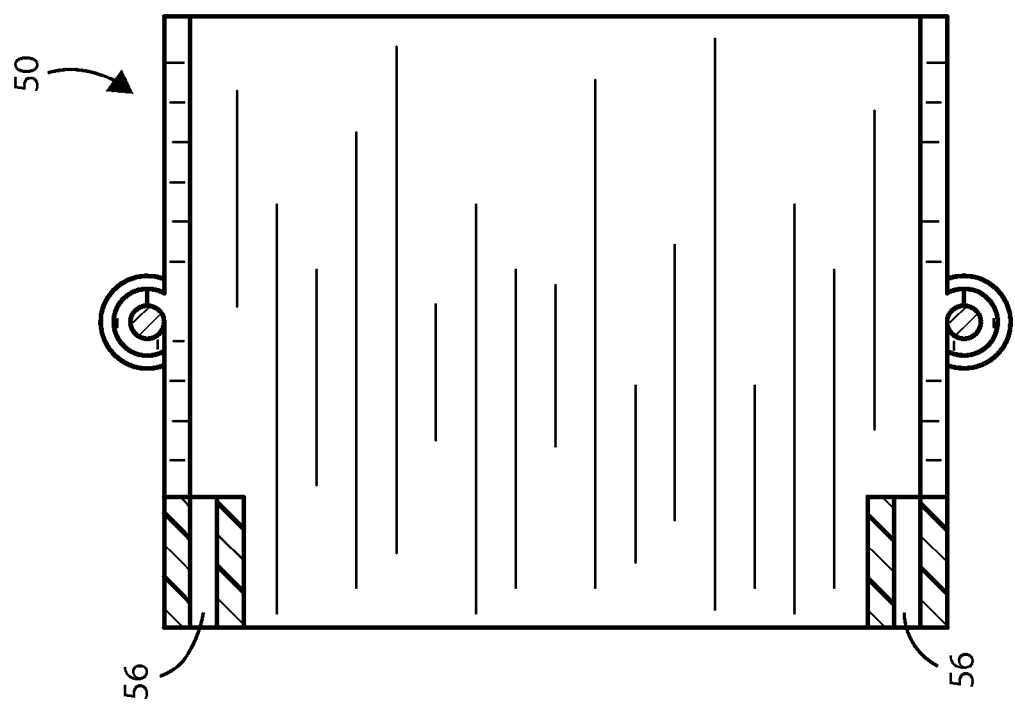
FIG. 19 is rear elevational view showing the second embodiment, with at least one portion removed, attached to the exemplary electrical connection enclosure box.
Figure 20:
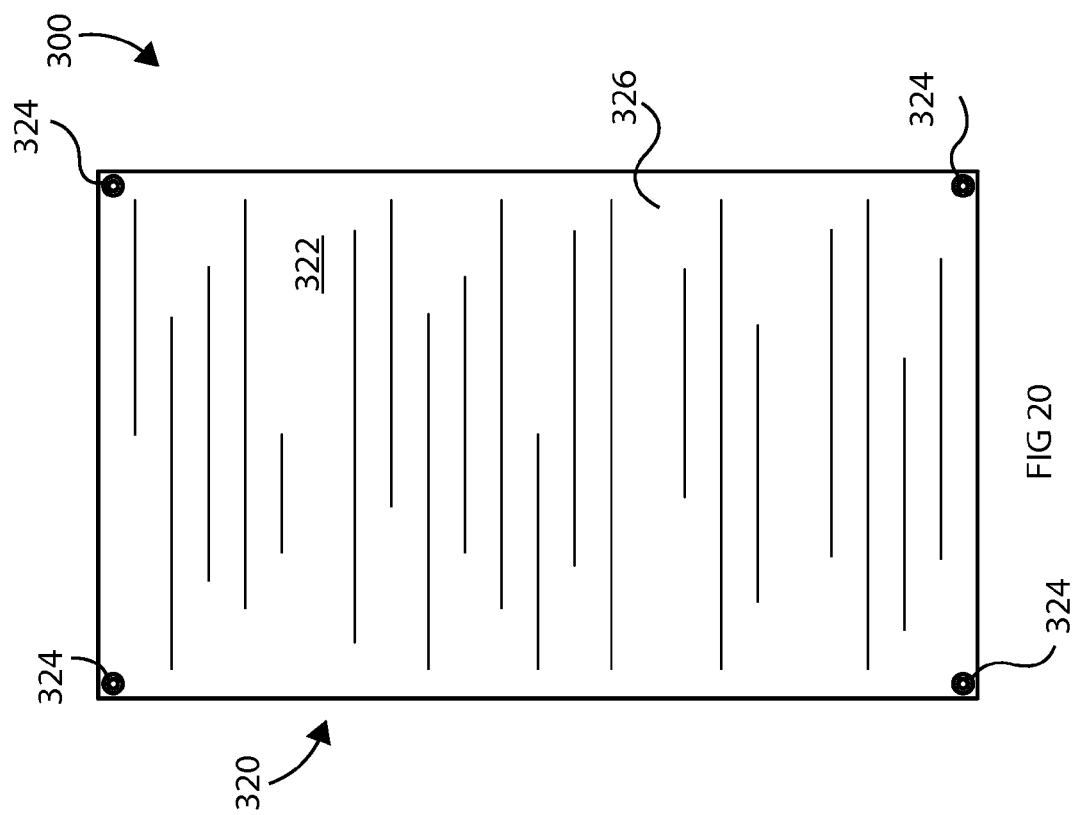
FIGS. 20-25 are various elevational views showing a third embodiment of the present invention, for a single gang enclosure box.
Figure 21:
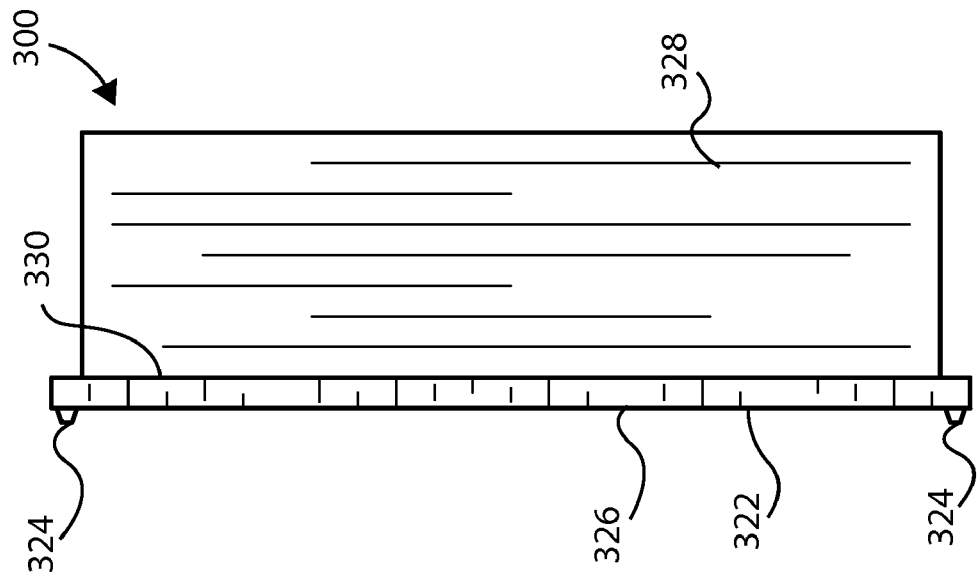
Figure 22:
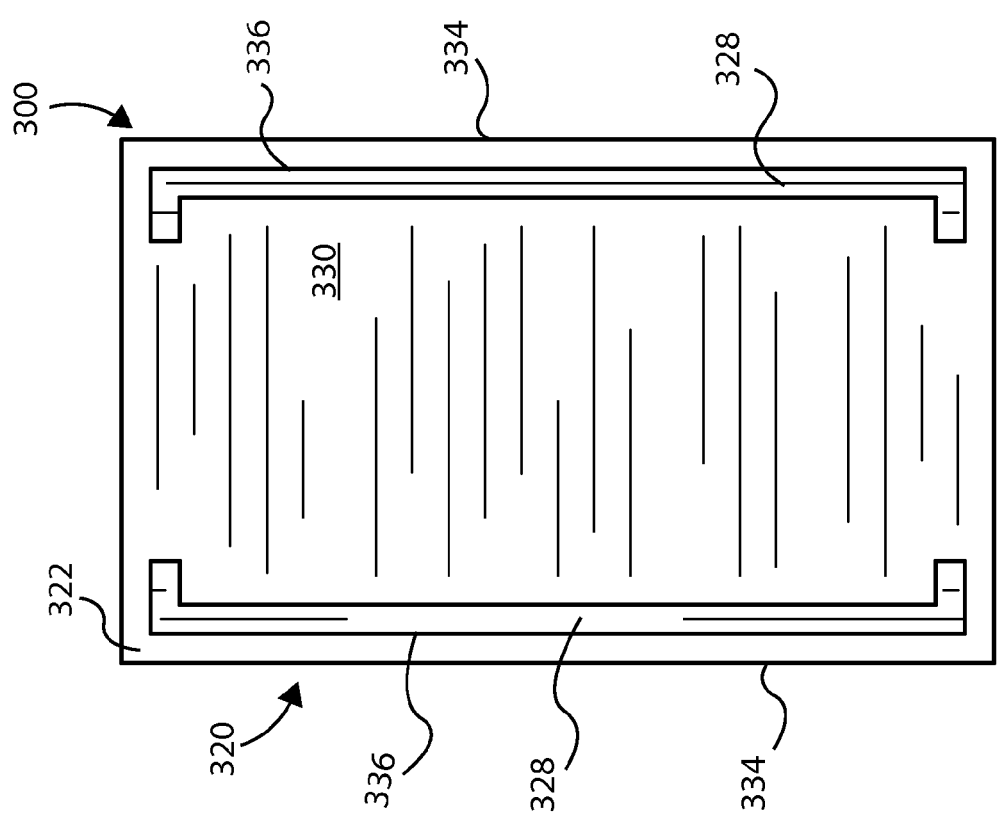
Figure 23:
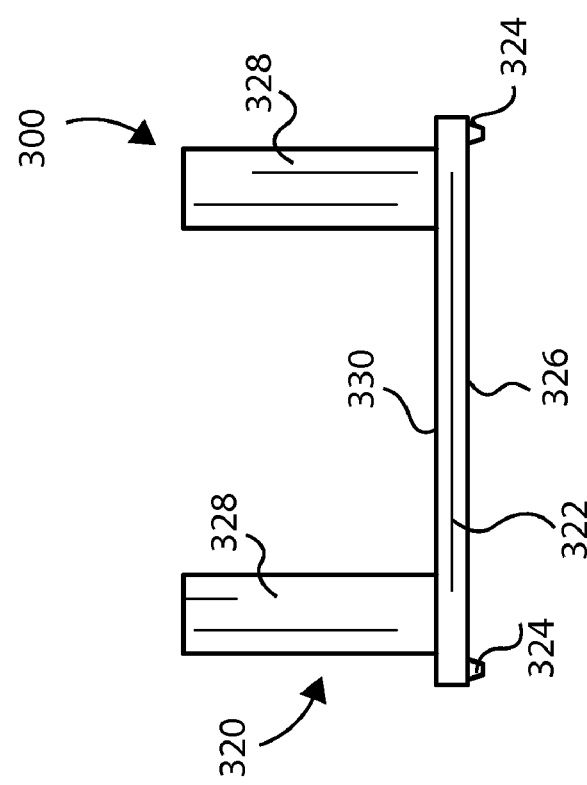
Figure 24:
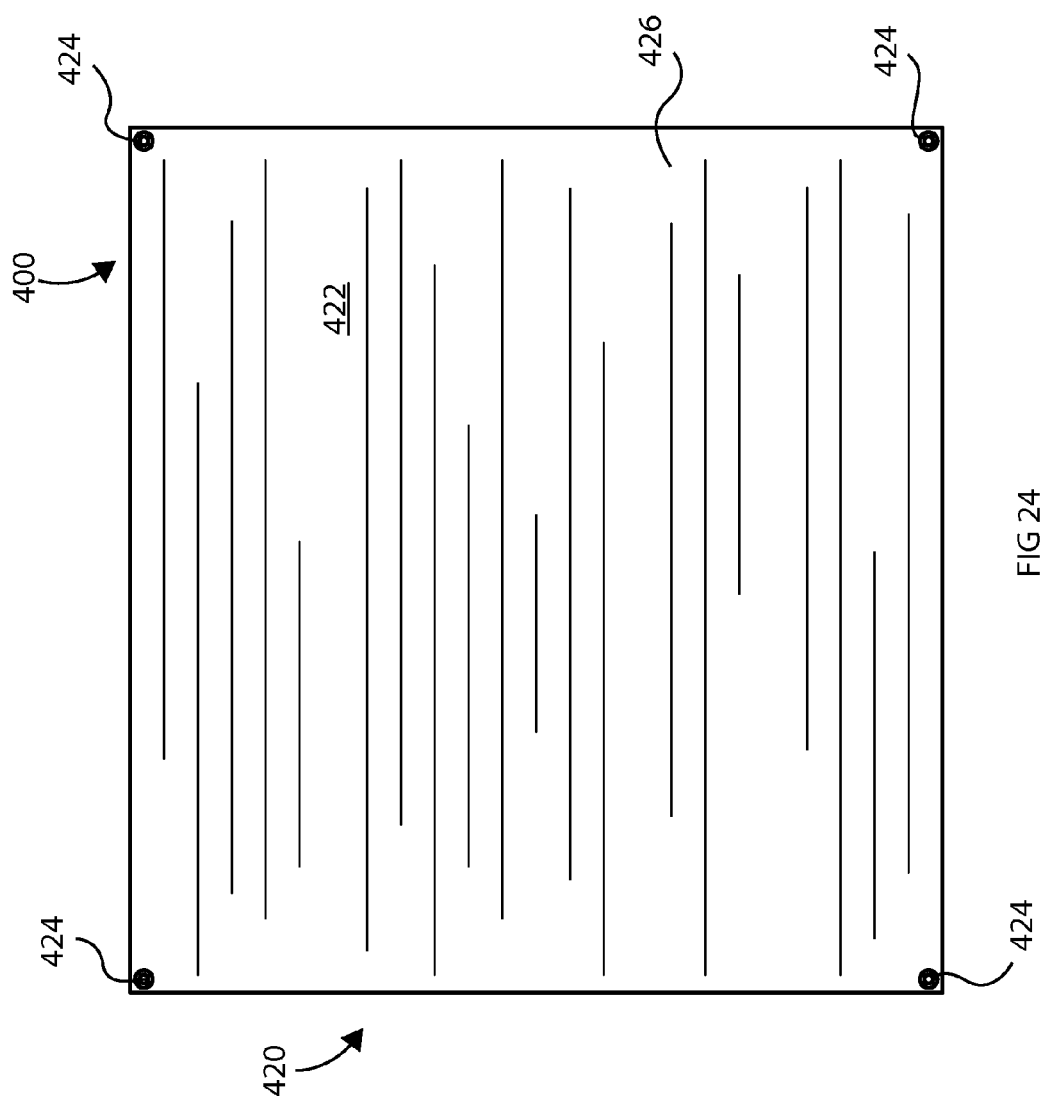
Figure 25:
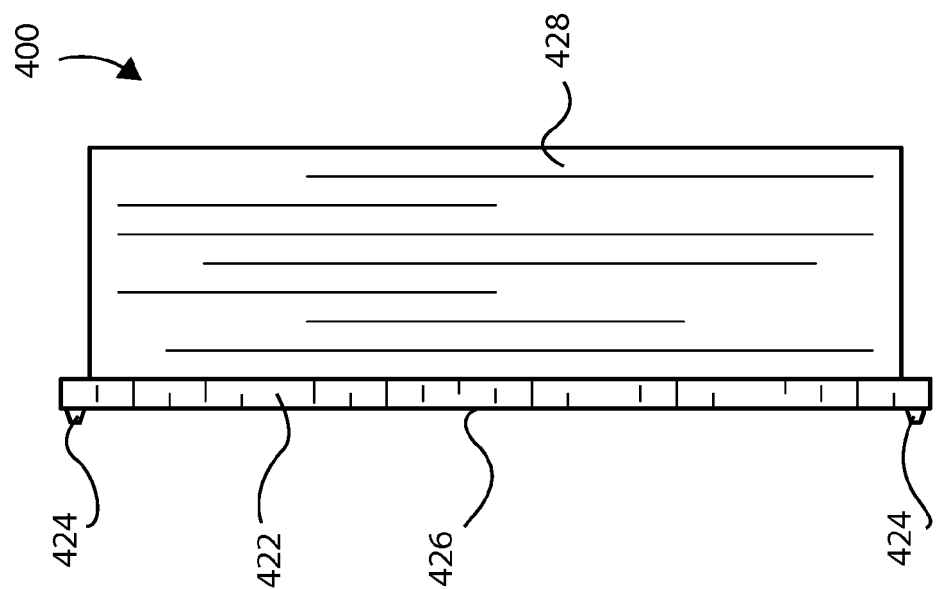
Figure 26:
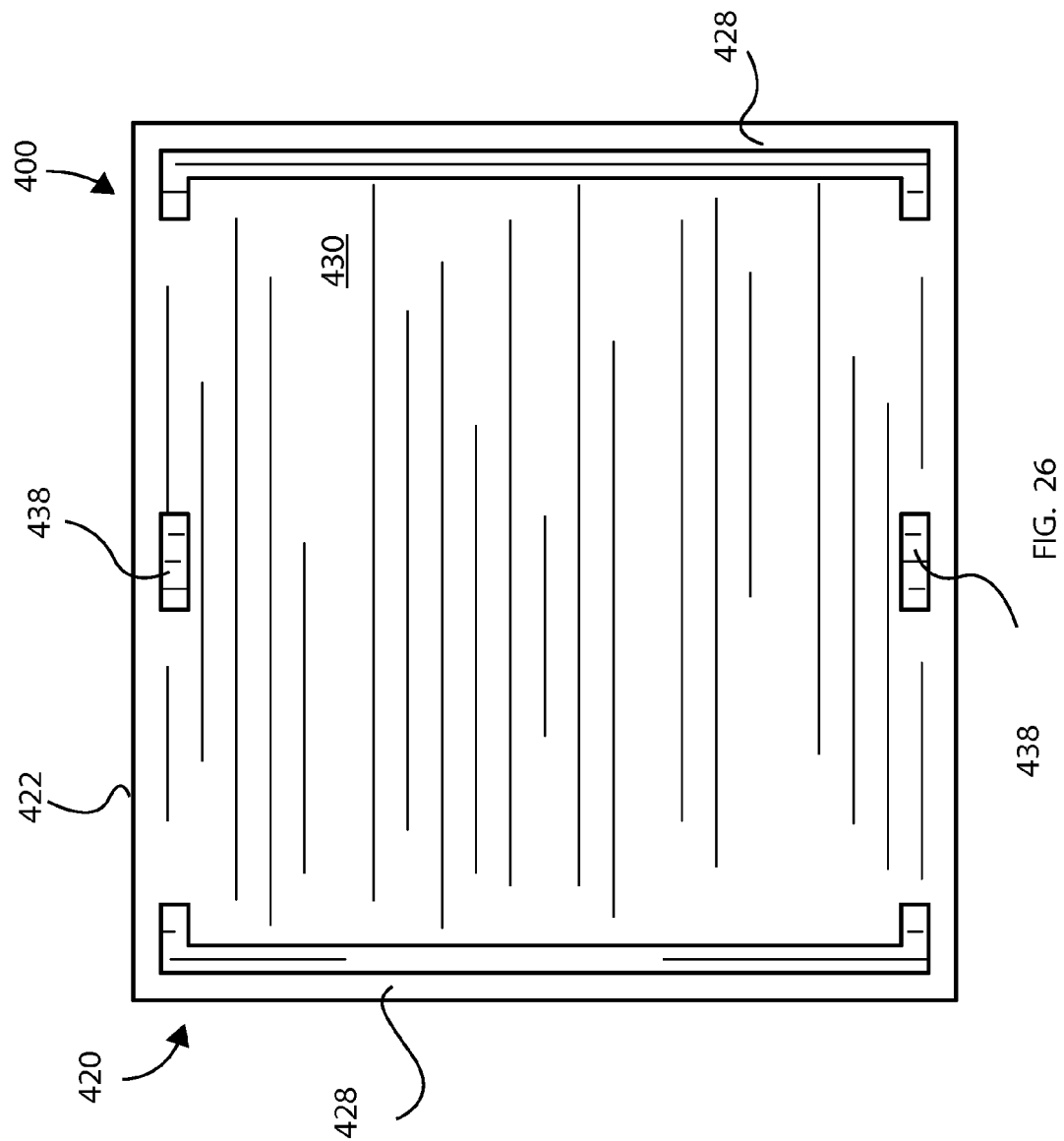
FIGS. 26-29 are various elevational views showing a fourth embodiment of the present invention, for a double gang enclosure box.
Figure 27:
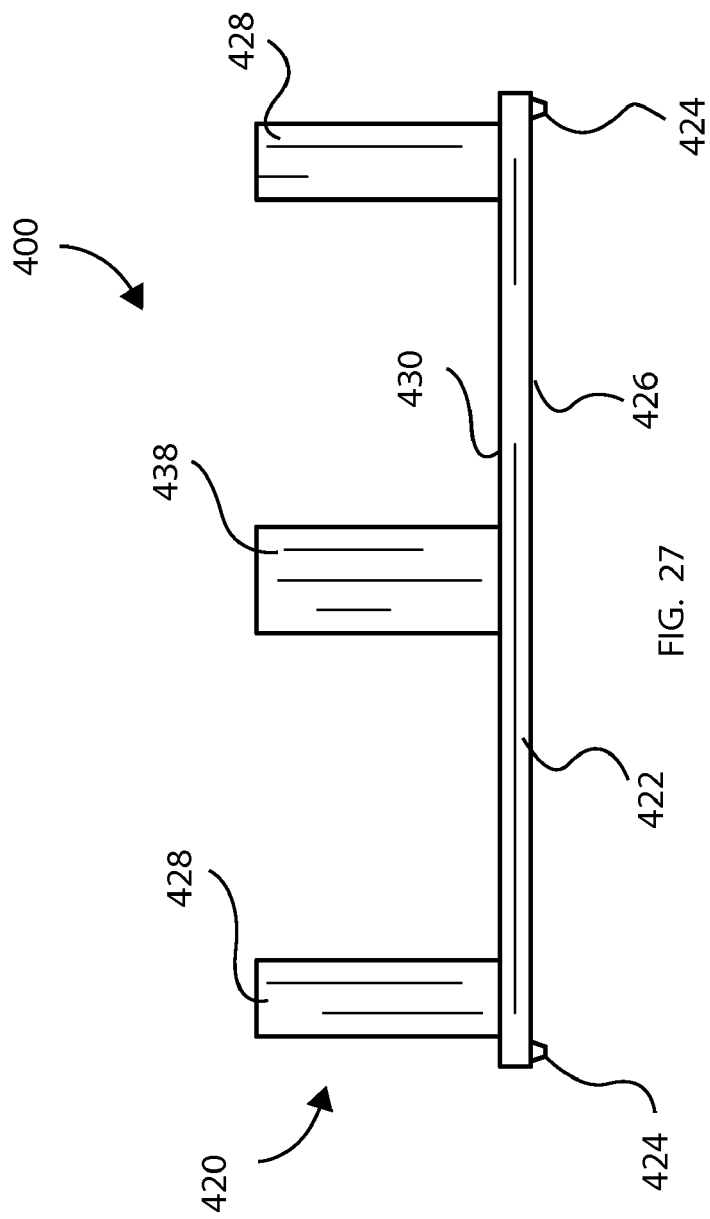
Figure 28:
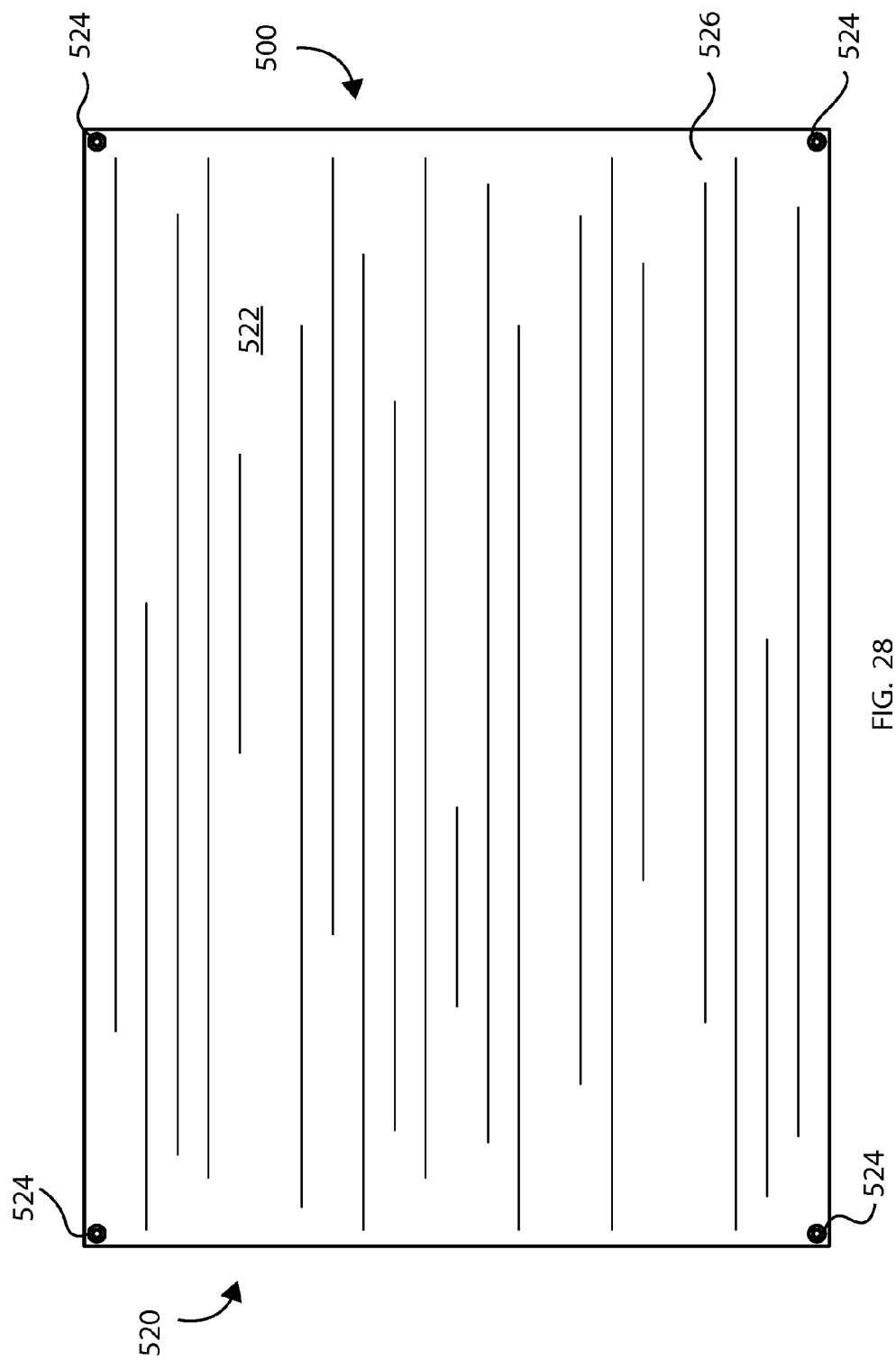
Figure 29:
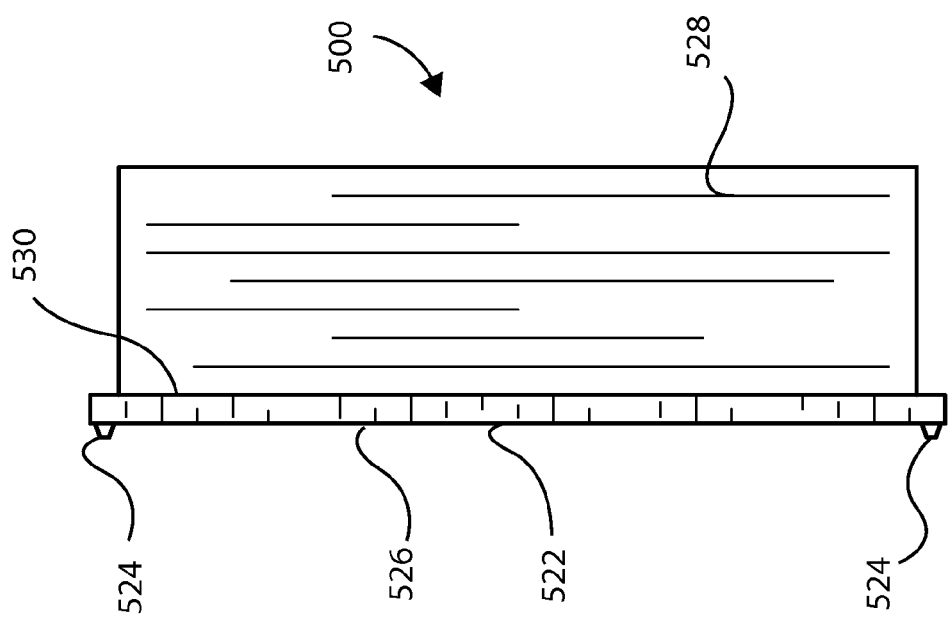
Figure 30:
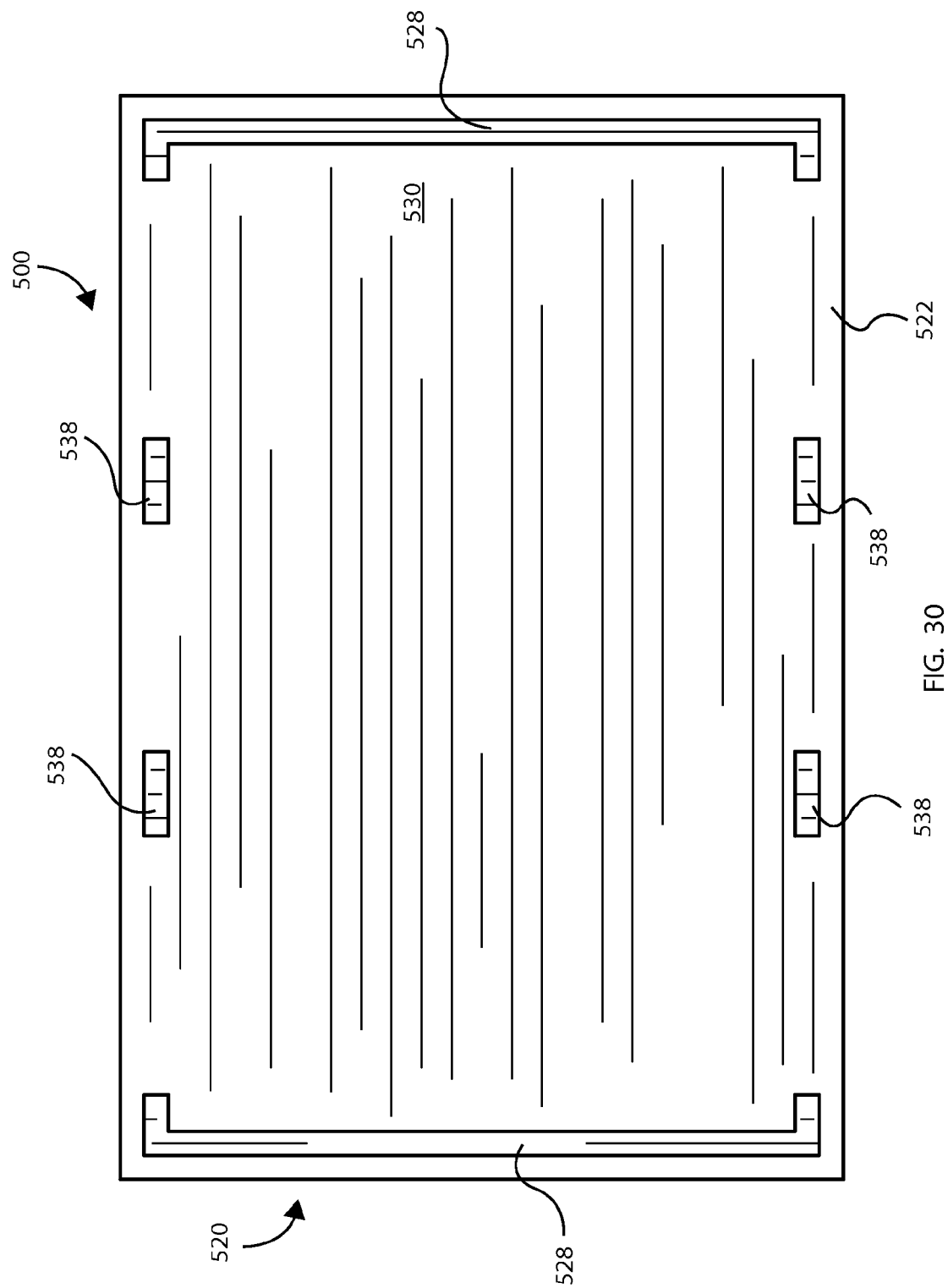
FIGS. 30-31 are various elevational views showing a fifth embodiment of the present invention, for a triple gang box.
Figure 31:
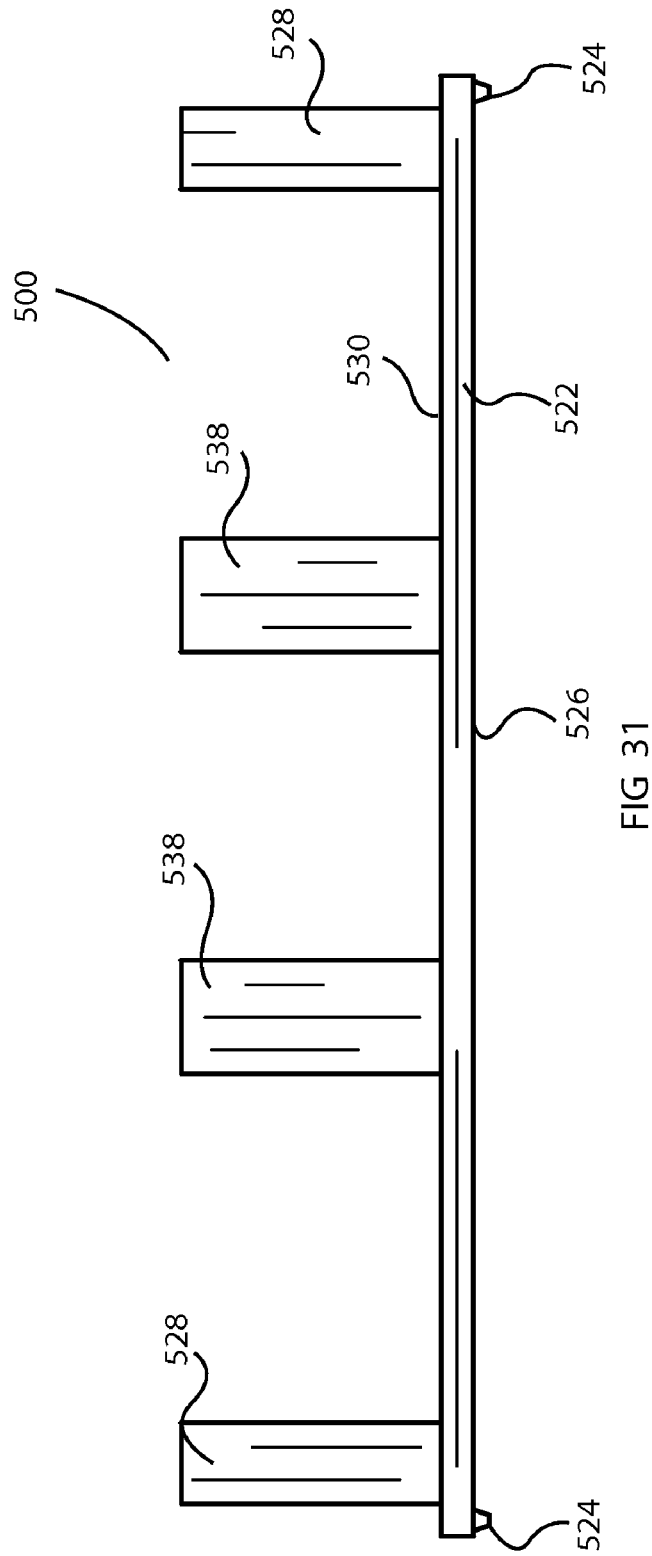
Figure 32:
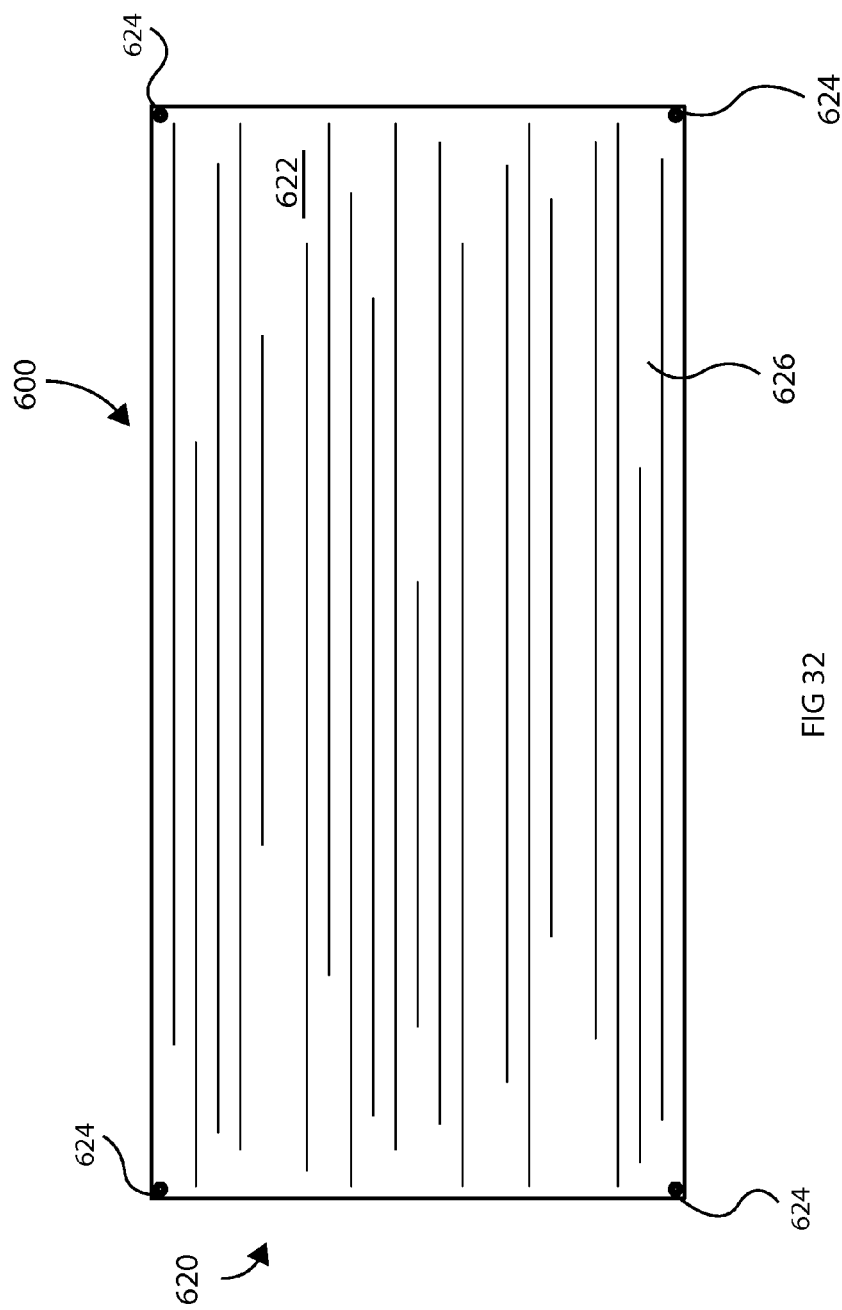
FIGS. 32-35 are various elevational views showing a sixth embodiment of the present invention, for a quadruple gang box.
Figure 33:
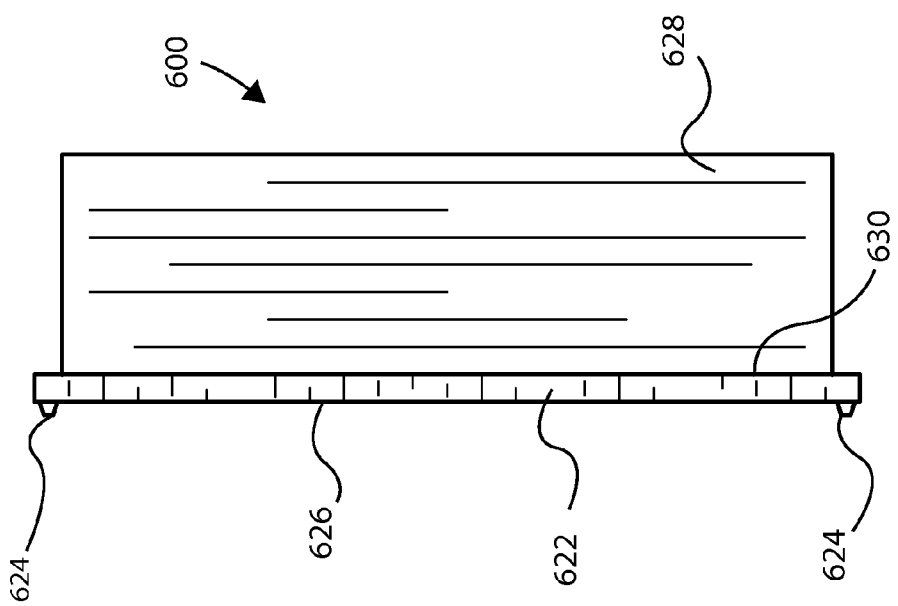
Figure 34:
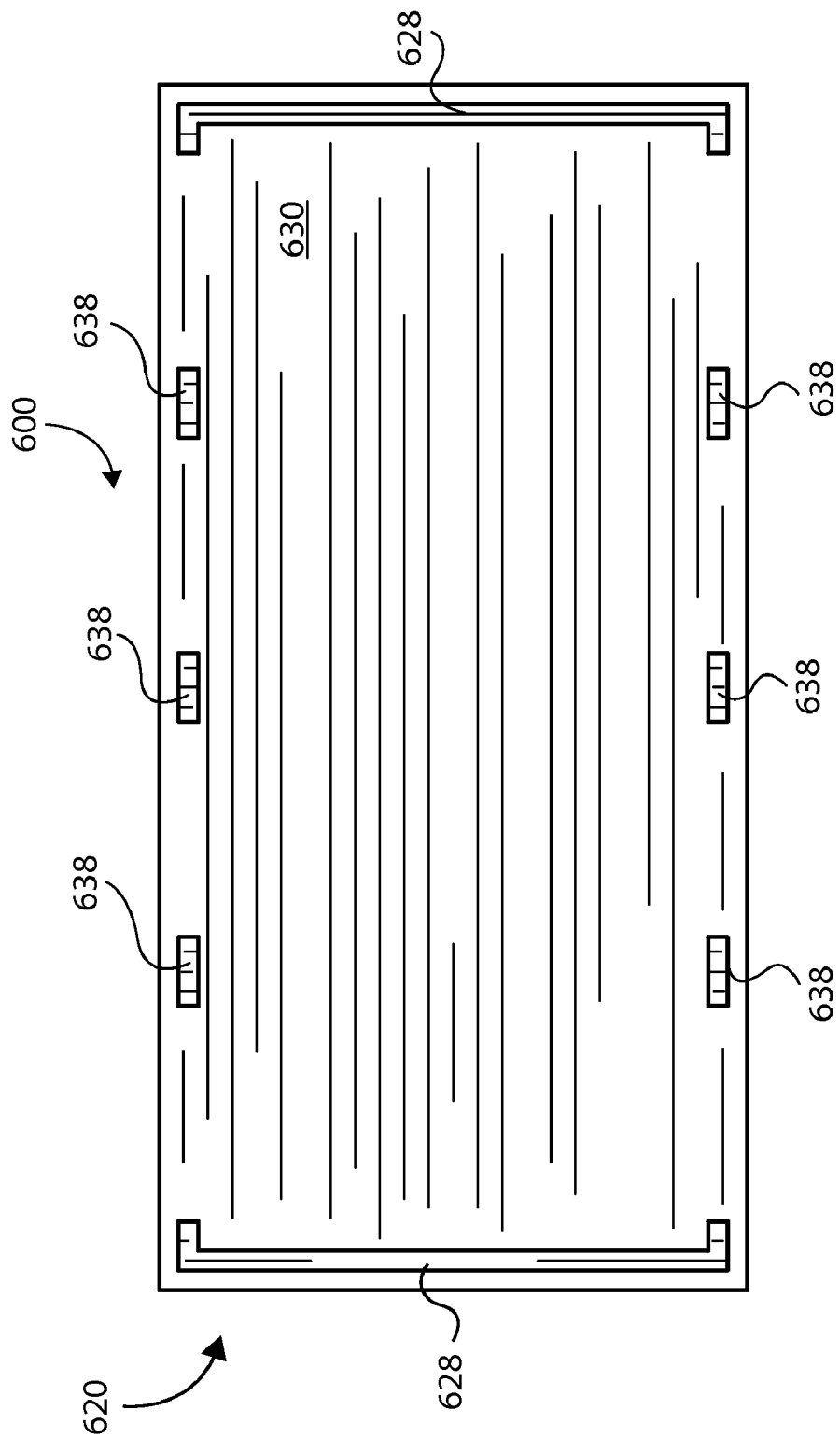
Figure 35:
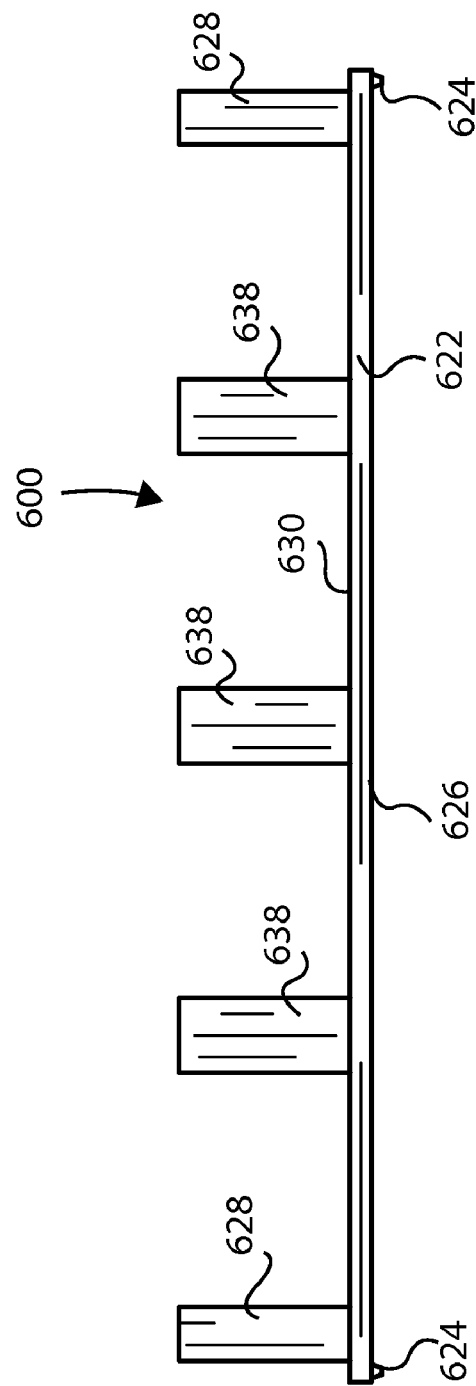
Figure 36:
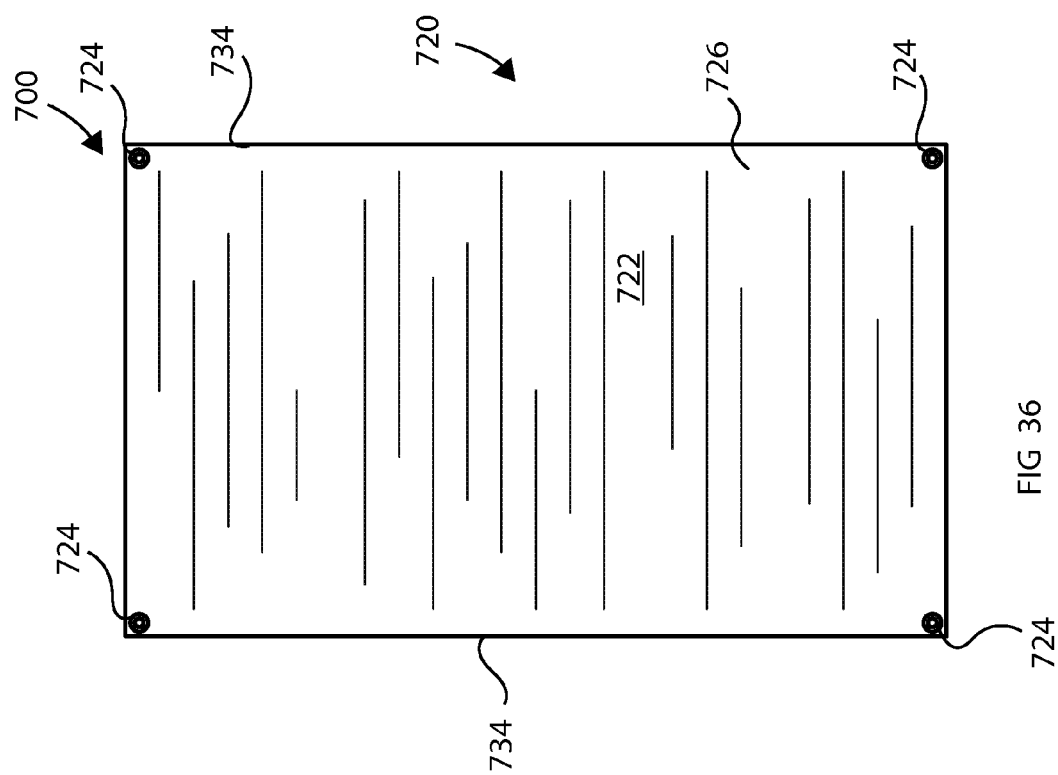
FIGS. 36-39 are various elevational views showing a seventh embodiment of the present invention, which is similar to the first embodiment shown in FIGS. 1-9.
Figure 37:
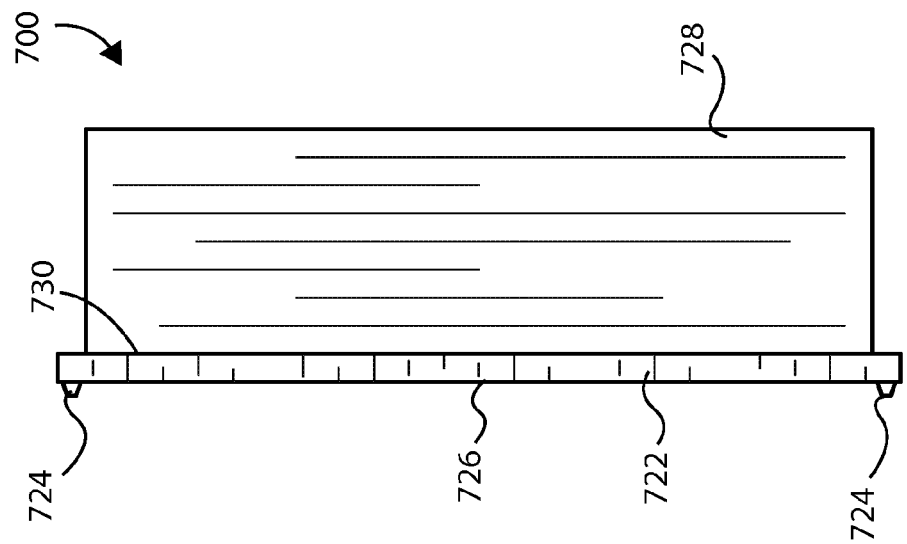
Figure 38:
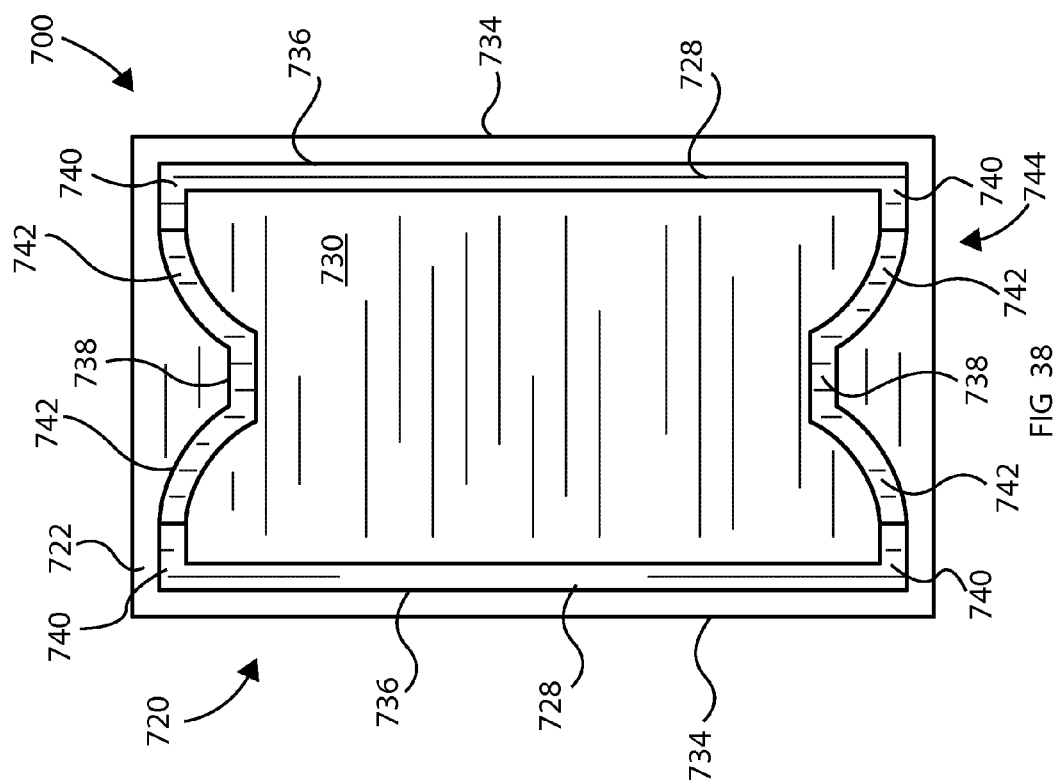
Figure 39:
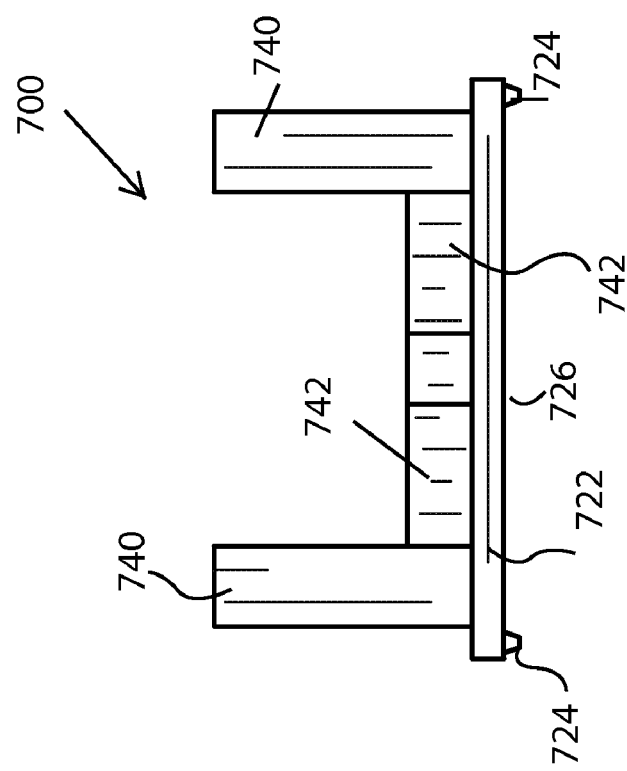
Figure 40:
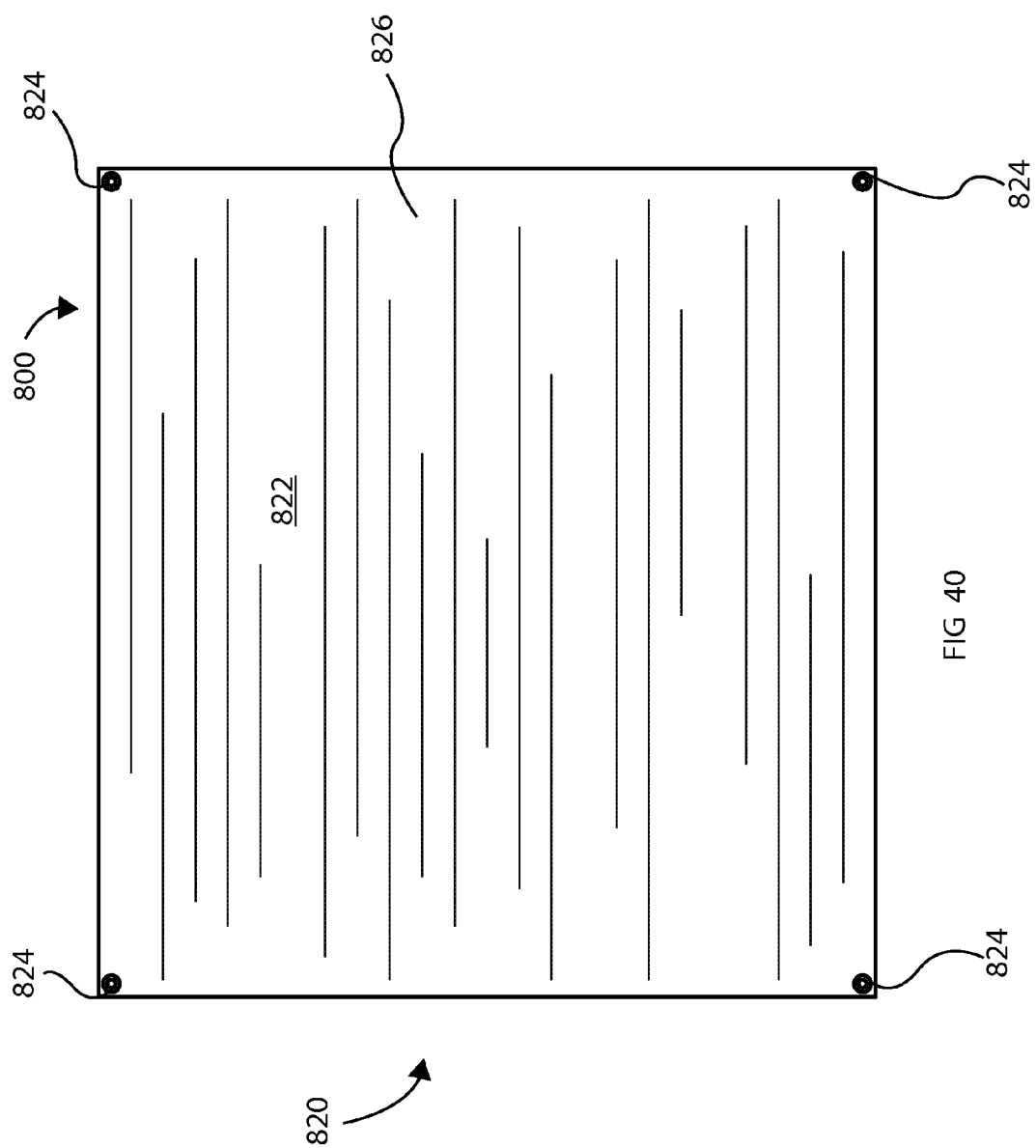
FIGS. 40-43 are various elevational views showing an eighth embodiment of the present invention, for a double gang enclosure box.
Figure 41:
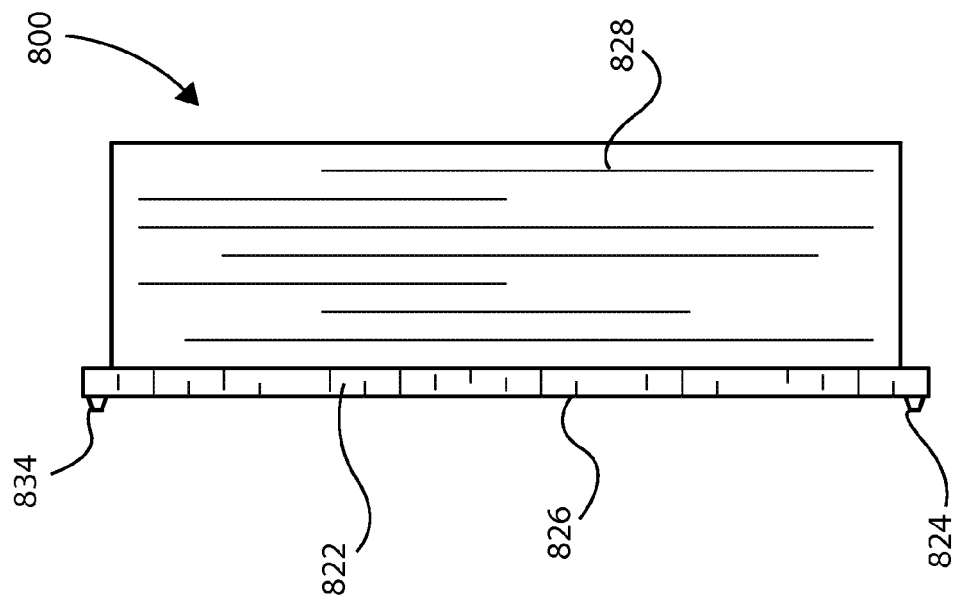
Figure 42:
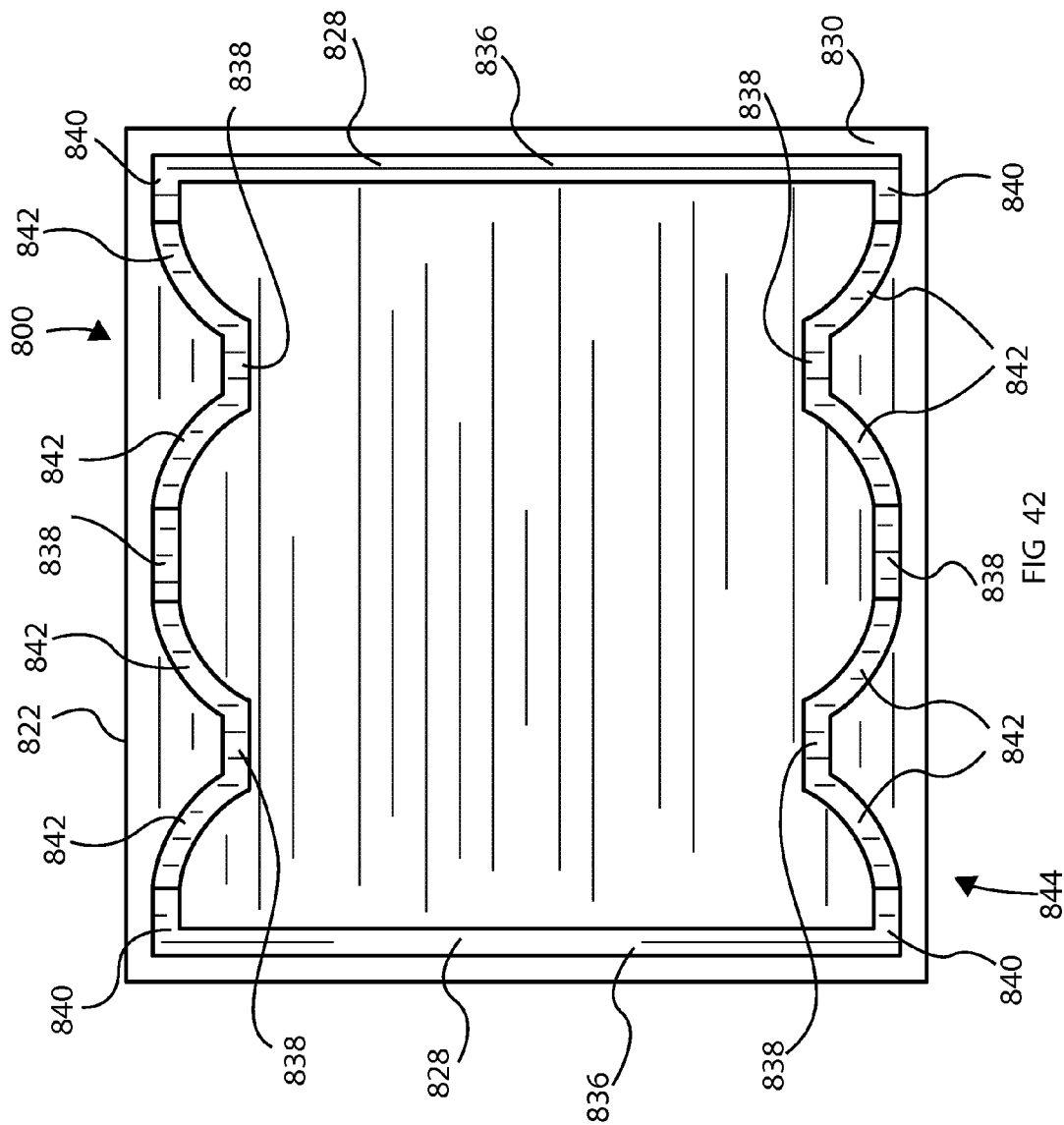
Figure 43:
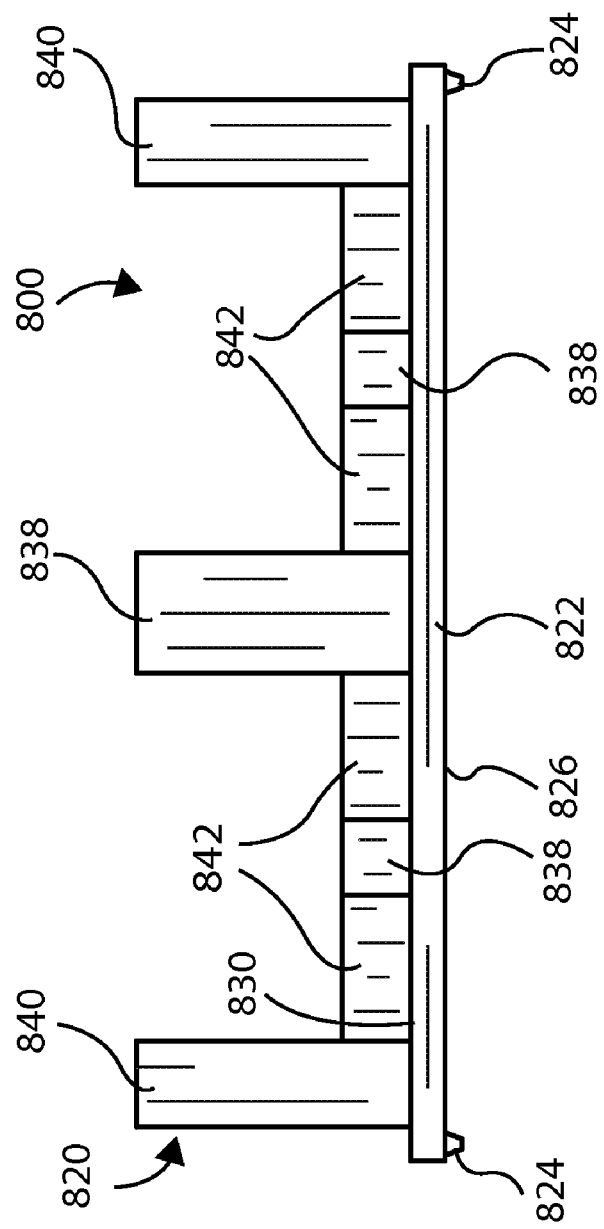
Figure 44:
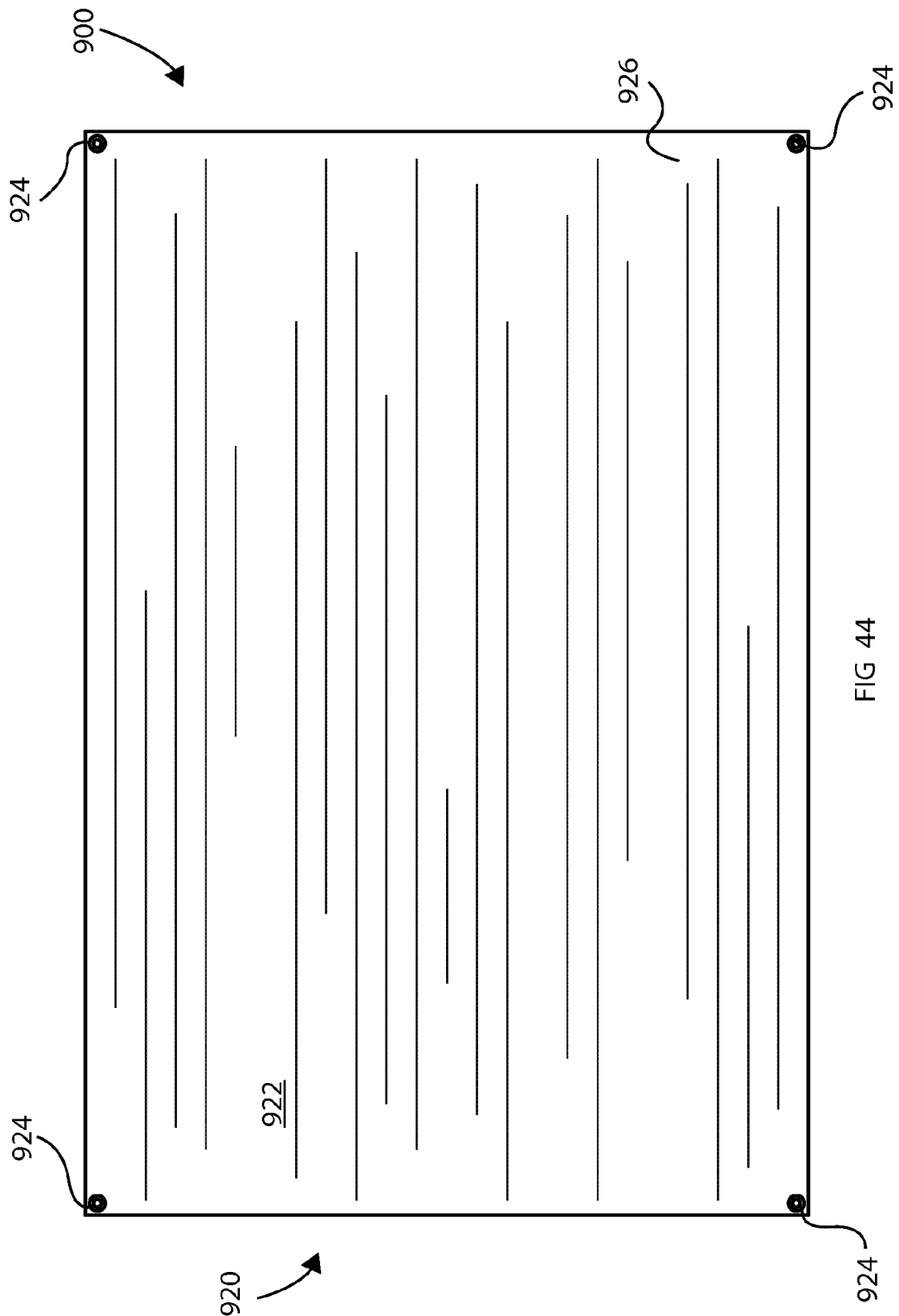
FIGS. 44-47 are various elevational views showing a ninth embodiment of the present invention, for a triple gang box.
Figure 45:
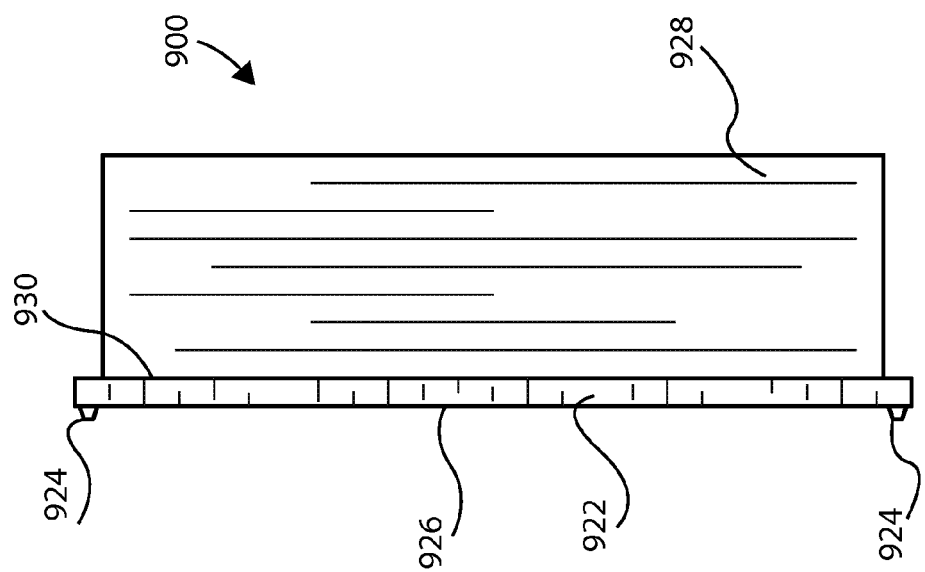
Figure 46:
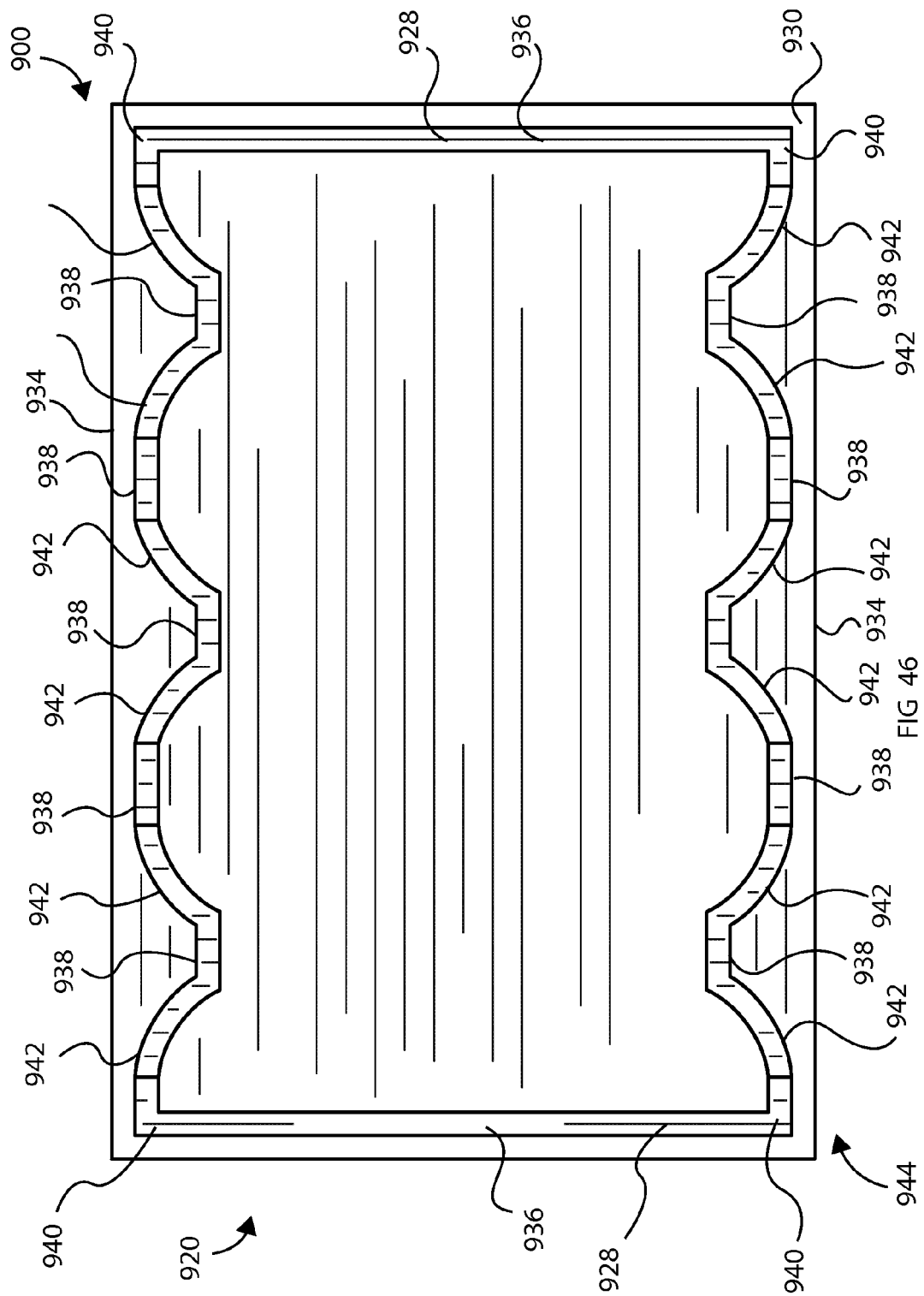
Figure 47:
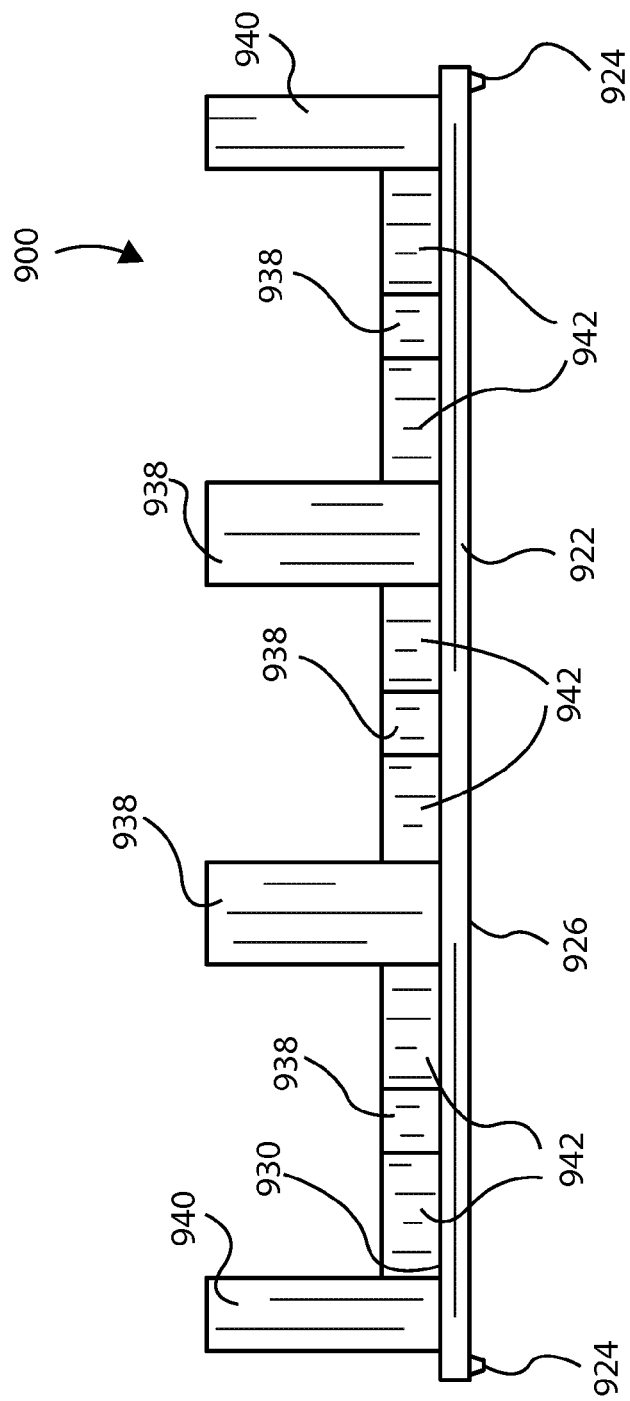
Figure 48:
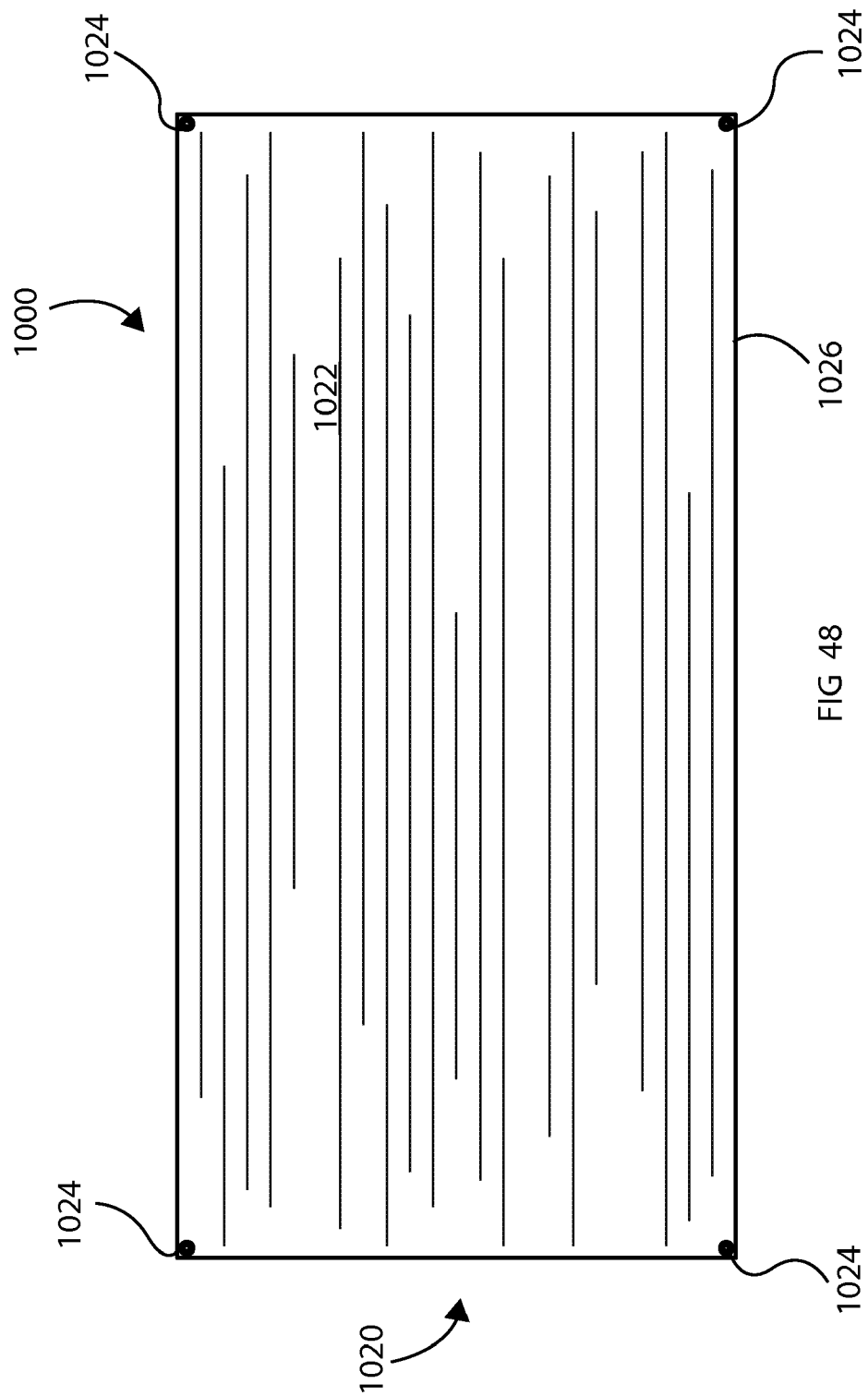
FIGS. 48-51 are various elevational views showing a tenth embodiment of the present invention, for a quadruple gang box.
Figure 49:
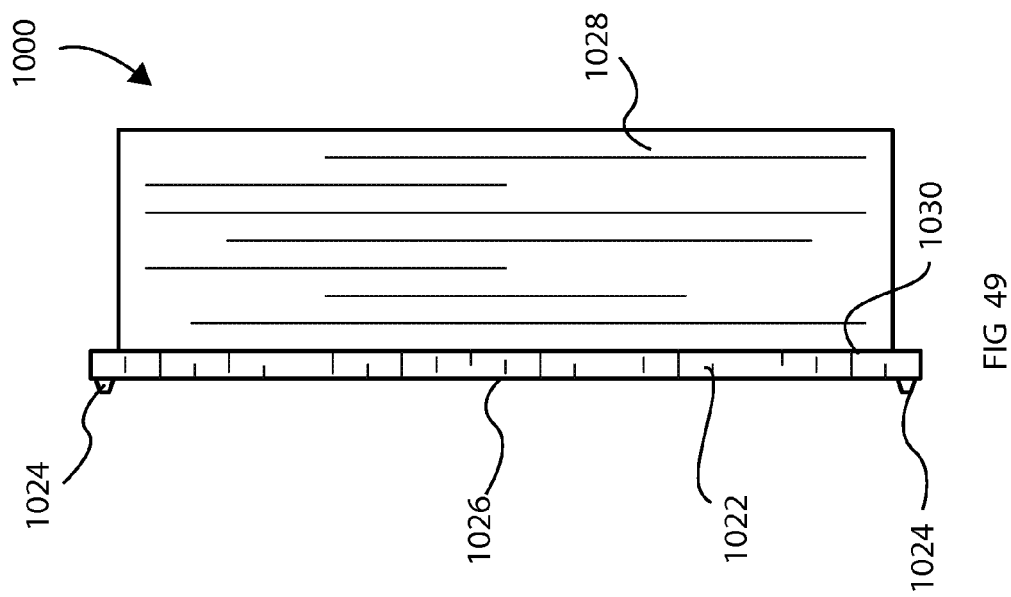
Figure 50:
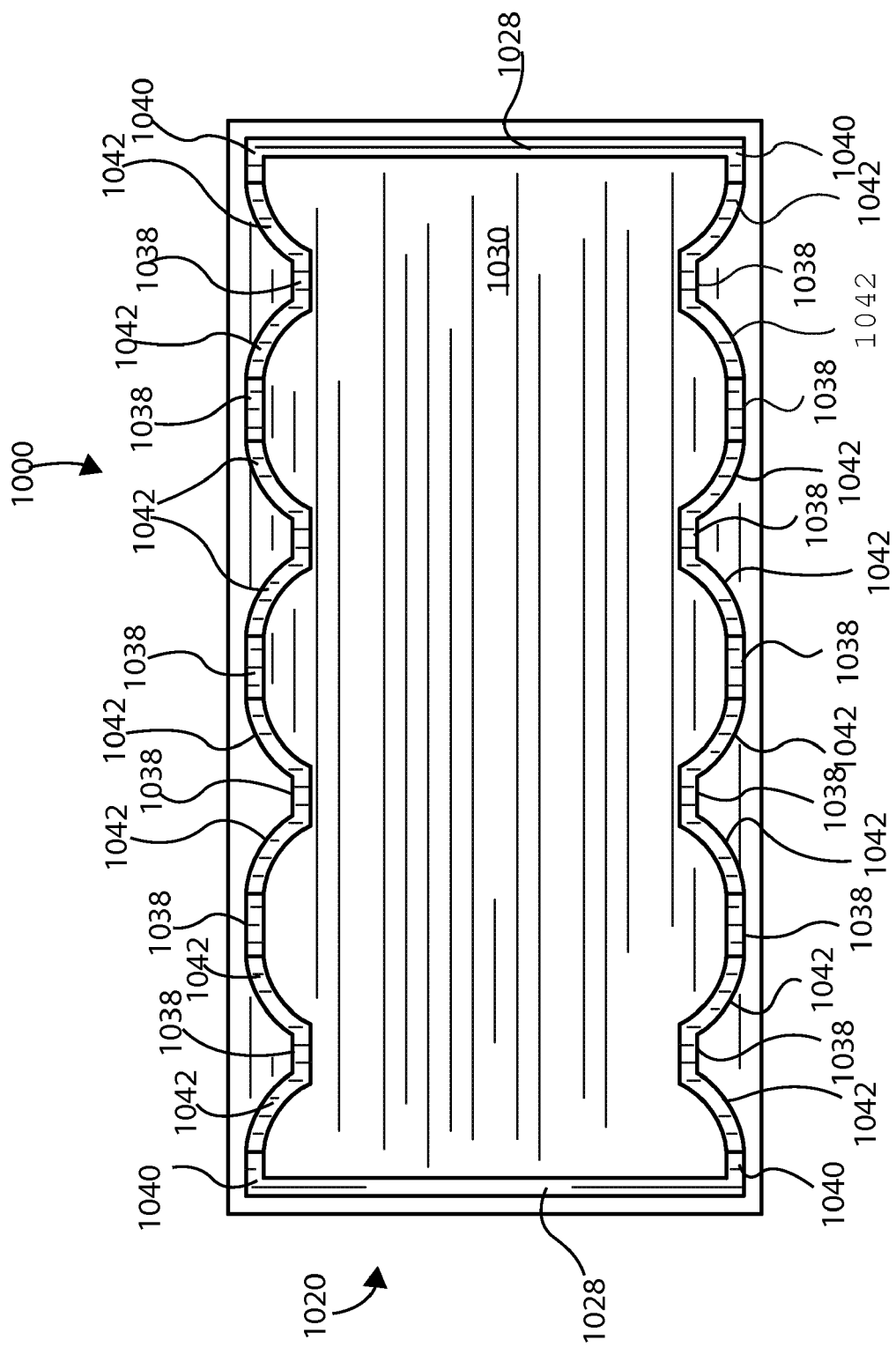
Figure 51:
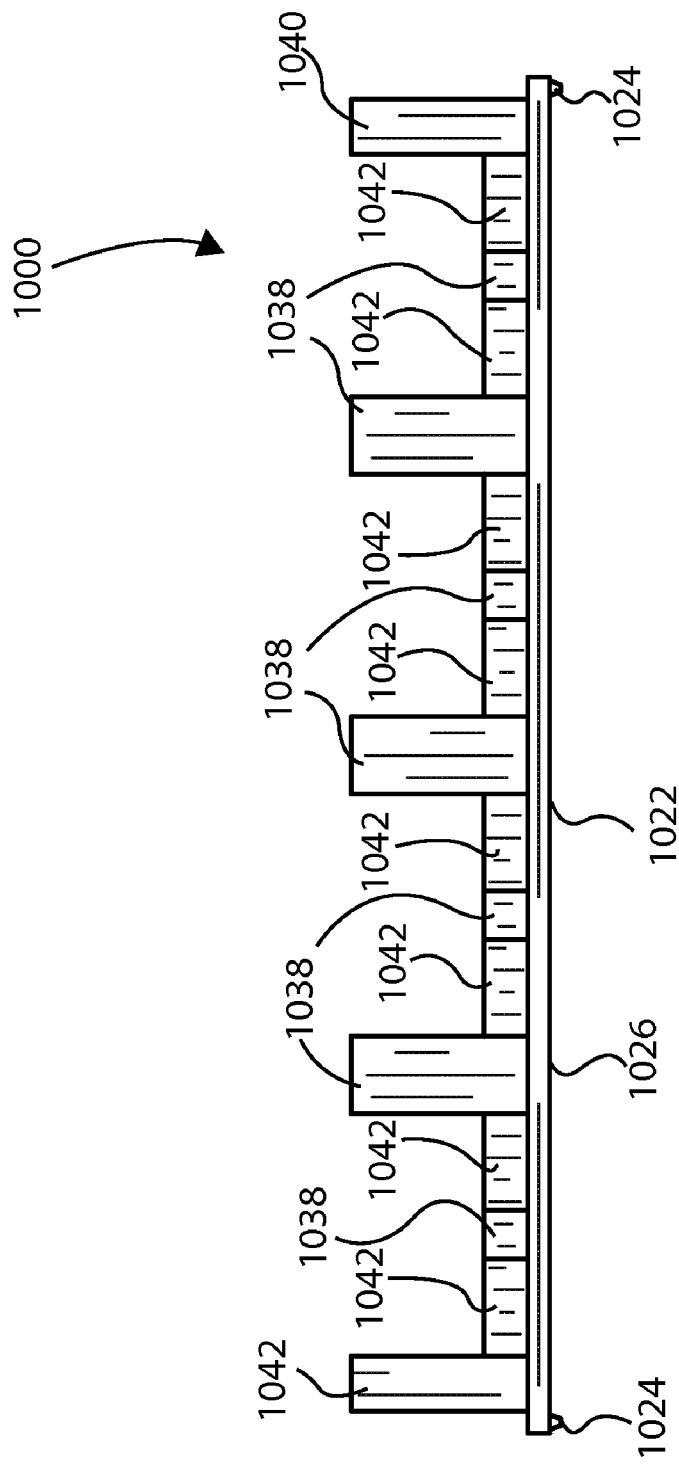

The apparatus of this invention is referred to generally in FIGS. 1-51 and is intended to provide an electrical connection enclosure cover plate as shown in the various embodiments identified by reference numerals 100, 200, 300, 400, 500, 600, 700, 800, 900 and 1000, respectively. It should be understood that the electrical connection enclosure cover plate may be used to cover and protect electrical wiring inside electrical connection enclosure boxes during many different types of construction activities such as during drywall installation, texturing and painting processes and the like.

In particular, the various embodiments are identified as follows: the first embodiment 100 is illustrated in FIGS. 1-8; a second embodiment is illustrated in FIGS. 9-19; a third embodiment is illustrated in FIGS. 20-23; a fourth embodiment is shown in FIGS. 24-27; a fifth embodiment is shown in FIGS. 28-31; a sixth embodiment is shown in FIGS. 32-35; a seventh embodiment is shown in FIGS. 36-39; an eighth embodiment is shown in FIGS. 40-43; a ninth embodiment is shown in FIGS. 44-47; and a tenth embodiment is shown in FIGS. 48-51.

Referring to all the embodiments 100, 200, 300, 400, 500, 600, 700, 800, 900 and 1000, as a whole, the electrical connection enclosure cover plate is intended to be used during drywall installation as well as texturing, tiling and painting processes, for example. Each embodiment 100, 200, 300, 400, 500 600, 700, 800, 900 and 1000 may include a single and unitary body 120, 220, 320, 420, 520, 620, 720, 820, 920 and 1020 preferably having a substantially rectangular and planar outer wall 122, 222, 322, 422, 522, 622, 722, 822, 922 and 1022 adapted to be affixed to an existing electrical connection enclosure box 50. Of course, the present invention may be formed to fit round light outlet boxes, electrical connection enclosure boxes for stucco applications, metal commercial electrical connection enclosure boxes as well as low voltage rings, for example.

The outer wall 122, 222, 322, 422, 522, 622, 722, 822, 922 and 1022 preferably has a plurality of pins 124, 224, 324, 424, 524, 624, 724, 824, 924 and 1024 extending outwardly from an anterior face 126, 226, 326, 426, 526 and 626 thereof. The pins 124, 224, 324, 424, 524, 624, 724, 824, 924 and 1024 may be statically situated at opposed corners of the anterior face 126, 226, 326, 426, 526, 626, 726, 826, 926 and 1026, and further may be suitably sized and shaped to penetrate through an existing dry wall. Such pins 124, 224, 324, 424, 524, 624, 724, 824, 924 and 1024 are situated at opposed corners of the outer wall and advantageously mark the drywall without the need to measure the shape and size of the electrical connection enclosure box 50.

The cover plate 100, 200, 300, 400, 500, 600, 700, 800, 900 and 1000, and pins 124, 224, 324, 424, 524, 624, 724, 824, 924 and 1024 may be preferably formed from durable plastic or non-adhesive material, for example. Thus, drywall mud and paint are less likely to stick to the cover plate and can be removed with just a tap on the cover plate 100, 200, 300, 400, 500, 600, 700, 800, 900 and 1000.

As described below, each embodiment 100, 200, 300, 400, 500, 600, 700, 800, 900 and 1000, may be suitably sized and shaped to fit various electrical connection enclosure boxes that have one or more gangs. Tile installers will be able to make the right angle cut in tile and granite back splash, for example. Further, the cover plate 100, 200, 300, 400, 500, 600, 700, 800, 900 and 1000, can be easily removed before the drywall installers and painters are done with their work, allowing electricians to install receptacles and switches and thereafter reinstall the cover plate. This helps speed up the construction process and the receptacles/switches remain safe from drywall mud, texture or paint, for example.

Thus, the pins 124, 224, 324, 424, 524, 624, 724, 824, 924 and 1024 at each corner make it easy for a worker to mark the drywall without needing to measure the receptacle/switch location. This advantage is achieved by pressing the cover plate 100, 200, 300, 400, 500, 600, 700, 800, 900 and 1000, into the drywall to thereby mark the drywall with small indentations for eliminating the need to measure the box location, which saves time for the drywall installer. This also helps the worker reduce the likelihood of missing a drywall cut location. The cover plate 100, 200, 300, 400, 500, 600, 700, 800, 900 and 1000, also prevents the worker from being electrically shocked, after being applied to the electrical connection enclosure box.

Further advantages of the present invention are achieved at the rough electrical phase of construction. For example, there is no need to clean debris from the receptacle/enclosure boxes because the enclosure boxes 50 will not be covered by dry wall panels. The electrical wiring remains tucked away at a safe location while other workers finish their trade. The cover plate 100, 200, 300, 400, 500, 600, 700, 800, 900 and 1000, is easily attached and removed during different construction phases. During painting, there is no need to tape the receptacles and switches to keep them clean. During trim work, the switches and receptacles can be installed after rough electrical inspection without worrying that they will be damaged by other trades. This saves time and labor costs because the electrician only needs to put on permanent cover plates at the trim stage.

Further advantages of the present invention include the ability to protect electrical devices from damage during all phases of construction. Also, the electrical connection enclosure boxes will not be covered during the sheer-wall or stucco stage of construction. Tile installers will be able to make the right angle cut in tile and granite back splash, while safeguarding the installer from electrical shock.

In one embodiment, the face of the cover plate will not stick out past the drywall panel face (i.e., the electrical box is mounted $3/8''$ out from the face of the stud and the cover is an additional $3/16''$ which leaves $1/16''$ from the face of the drywall.) Having this configuration allows drywall installers to work around the electrical box 50 (with a router or drywall saw) without the need to remove the cover plate from the electrical box 50.

In one embodiment, the present invention may employ suitably shaped pins that are sharp enough to mark a slight dimple in the drywall panel for the box 50 location which ensures a perfect cut every time.

In one embodiment, the present invention may have oblong holes at the top and bottom of the face so that the cover plate can be easily removed with a flat blade screwdriver. Because of the press on fit, the present invention can be removed and reinstalled as needed.

In one embodiment, the present invention allows electricians to install devices (plugs and switches) before the drywall is complete. Thus, the cover plate will keep all electrical devices clean of drywall mud or paint.

During the normal construction cycle, the electrician installs rough electrical components, gets inspection and does not proceed until the drywall is complete and the painters have completed their work. With the present invention there will be no need to wait for other trades to complete their work. This will illuminate the need for the electrician to clean out drywall debris before completing trim electrical. With the present invention, electrical devices can be installed after rough electrical inspection and such electrical devices will remain safe from damage. The only part of the project left to do is trim electrical, which will save time and money for all trades.

In one embodiment, the present invention also serves as a safety device that can be used by electricians that have exposed live electrical boxes, thereby shielding a worker's fingers from live electrical wires.

Notably, the present invention has been designed to fit a variety of electrical boxes (single gang, two gang, three gang, four gang, stucco box, 3/0, 4/0 ceiling fan boxes, metal and plastic boxes of any and all types). Further, the present invention may employ a variety of different face thickness for all applications. For example, a $1/2''$ thick cover may be employed for stucco wall applications, which prevents the outlet box 50 from being buried by the stucco contractor and also keeps the box 50 free from debris so that electrical devices can be installed after rough electrical inspection. Again, this will save the electrician time and money because there will be no need to find a buried box and clean out the debris from therein. Advantageously, other trades will also save time and money and expedite the process.

In one embodiment, the ½" thick cover plate may be used during tile and granite installation. For example, the present invention may be installed after the rough electrical stage and thereby permit the electrician to immediately install the electrical devices. The present invention assists the tile and granite installers to obtain accurate measurements of the electrical box location, which saves time and money. The present invention also helps the tile setters accurately cut the holes the first time, which eliminates the need to have the electrician chip out or break tiles to install permanent cover plates, for example.

Further, in one embodiment, the present invention will be useful when a homeowner or contractor is redoing counter tops. When this type of project is being done, the tile setter needs to remove all receptacles and switches from the electrical boxes and the electrical devices become exposed, thereby hanging by the live electrical wires. The present invention may be used to cut and tile around the electrical connection enclosure box 50 so that the receptacles and switches fit back into the mounting holes. Thus, the present invention also encloses the electrical devices to provide a safe work area and prevent electrical shock.

In one embodiment, the present invention may also be used by homeowners and painters. For example, the present invention may be installed over electrical devices (plugs and switches), which also provides a safe work environment. Advantageously, the present invention eliminates the need to use painter's tape to cover receptacles and switches. The user can simply place the present invention over the electrical connection enclosure box 50 and start painting or applying wall paper on the drywall. Again, the present invention will save time and money while covering all exposed wiring and terminal screws that could cause electrical shock if touched.

Now referring to FIGS. 1-51 as a whole, the body 120, 220, 320, 420, 520, 620, 720, 820, 920 and 1020 further preferably has a plurality of primary panels 128, 228, 328, 428, 528, 628, 728, 828, 928 and 1028 directly connected to a posterior face 130, 230, 330, 430, 530, 630, 730, 830, 930 and 1030 of the outer wall 122, 222, 322, 422, 522, 622, 722, 822, 922 and 1022. The primary panels 128, 228, 328, 428, 528, 628, 728, 828, 928 and 1028 may extend rearwardly and away from the posterior face 130, 230, 330, 430, 530, 630, 730, 830, 930 and 1030. The primary panels 128, 228, 328, 428, 528, 628, 728, 828, 928 and 1028 may further be adapted to frictionally engage the existing electrical connection enclosure box 50.

As perhaps best shown in FIGS. 1-19, the outer wall 122, 222 may be provided with at least one opening 132, 232 formed therein for assisting a user to remove the body 120, 220 from the existing electrical connection enclosure box 50. As can be seen in FIGS. 1-8, openings 132 may be precut slots or, as an alternative, FIGS. 9-19 show the openings 232 as being perforated segments that are selectively detachable from the outer wall 222 for permitting a user to grip the body 220 and remove same from the electrical connection enclosure box 50.

Referring to FIGS. 9-19, the electrical connection enclosure box 50 may include a plurality of break-away portions 55 formed at a rear face 57 thereof. Such break-away portions 55 may be disengaged from a rear face 57 of the box 50, such as opposed rear corners of the box 50, during installation and thereby define a passageways 56 through which electrical wiring is passed, for example.

Of course, the electrical enclosure box 50 may also have a solid rear face 57' through which an electrician can drill a hole, as needed. Similarly, body 220 may include a plurality of break-away portions 59 or 59' that are removable from either a posterior side 230 of the outer wall 222 or the primary panels 228. When such break-away portions 59, 59' are removed, multiple passageways 60, 60' are formed through which electrical wiring is passed, for example. Such passageways 60, 60' are preferably aligned with passageways 56 of box 50 for easily positioning the electrical wires therethrough.

Referring back to the FIGS. 1-51, the body 120, 220, 320, 420, 520, 620, 720, 820, 920 and 1020 may be adapted to be detachably coupled to the existing electrical connection enclosure box 50 such that the outer wall 122, 222, 322, 422, 522, 622, 722, 822, 922 and 1022 may be adapted to cover and shield a front opening 51 of the existing electrical connection enclosure box 50 from undesirable debris and fluids. The primary panels 128, 228, 328, 428, 528, 628, 728, 828, 928 and 1028 may be registered orthogonally to the posterior face 130, 230, 330, 430, 530, 630, 730, 830, 930 and 1030 of the outer wall 122, 222, 322, 422, 522, 622, 722, 822, 922, 1022, respectively.

Now referring to FIGS. 1-23 and 36-39 outer walls 122, 222, 322 and 722 of embodiments 100, 200, 300 and 700 preferably have oppositely situated rectilinear edges 134, 234, 334 and 734 registered parallel to longitudinal lengths 136, 236, 336 and 736 of the primary panels 128, 228, 328 and 738 respectively, such that the primary panels 128, 228, 328 and 738 extend along a major longitudinal length 136, 236, 326 and 736 of the rectilinear edges 134, 234, 334 and 734 respectively.

Now referring to FIGS. 1-8 and 24-51, body 120, 420, 520, 620, 720, 820, 920 and 1020 of embodiments 100, 400, 500, 600, 700, 800, 900 and 1000 further include a plurality of auxiliary panels 138, 438, 538, 638, 738, 838, 938, 1038 directly connected to the posterior face 130, 430, 530, 630, 730, 830, 930 and 1030 of outer wall 122, 422, 522, 622, 722, 822, 922 and 1022 such that the auxiliary panels 138, 438, 538, 638, 738, 838, 938 and 1038 extend rearwardly therefrom. The auxiliary panels 138, 438, 538, 638, 738, 838, 938 and 1038 are also registered orthogonally to the posterior face 130, 430, 530, 630, 730, 830, 930 and 1030 and remain intermediately positioned between the primary panels 128, 428, 528, 628, 728, 828, 928 and 1028, respectively.

As can be seen in FIGS. 1-9, 24-27 and 36-43, embodiments 100, 400, 700 and 800 show the auxiliary panels 138, 438, 738 and 838 aligned along latitudinal edges of the outer walls 122, 422, 722 and 822. Other embodiments 500, 600, 900 and 1000 show auxiliary panels 528, 628, 928 and 1028 aligned along longitudinal edges of outer walls 522, 622, 922 and 1022 thereby providing a versatile cover plate for multiple applications.

Now referring back to FIGS. 1-8, such an embodiment 100 further includes a plurality of arcuately shaped members 140 directly connected to axially opposed ends of the primary panels 128 respectively for increasing a surface area against which the body 120 is adapted to frictional engage the existing electrical connection enclosure box 50. FIGS. 36-51 show embodiments 700, 800, 900 and 1000 having similar members to embodiment 100. However, such corners may be formed at right angles rather than arcuately shaped, for example.

As further shown in FIGS. 1-8 and 36-51, the auxiliary panels 138, 738, 838, 938 and 1038 of embodiments 100, 700, 800, 900 and 1000 preferably have a curvilinear and oscillating shape configured in such a manner that the opposed ends of auxiliary panels 138, 738, 838, 938 and 1038 respectively define opposed ends 142, 742, 842, 942 and 1042 directly coupled to the arcuately shaped members 140 (or right angle corners 740, 840, 940 and 1040), and thereby define a continuous frame 144, 744, 844, 944 and 1044 inwardly offset along an outer perimeter of the posterior face 130, 730, 830, 930 and 1030, respectively. The arcuately shaped members 140 and right angle members 740, 840, 940 and 1040 are intermediately situated between the primary 128, 728, 828, 928 and 1028 and auxiliary 138, 738, 838, 938 and 1038 panels respectively, such that the arcuate shaped members 140 and right angle members 740, 849, 940 and 1040 define opposing corners of the frame 144, 744, 844, 944 and 1044, respectively.

Now referring to FIGS. 20-36 and 40-51 the auxiliary panels 138, 438, 538, 638, 838, 938 and 1038 of embodiments 300, 400, 500, 600, 800, 900 and 1000 are shown as preferably spaced apart along the rectilinear edges 334, 434, 534, 634, 834, 934 and 1034 of the outer wall 322, 422, 522, 622, 822, 922 and 1022 and further remain statically coupled to the posterior face 330, 430, 530, 630, 830, 930 and 1030 of the outer wall 322, 422, 522, 622, 822, 922 and 1022, respectively.

The present invention may further include a method for shielding an existing electrical connection enclosure box 50 during drywall installation, texturing and painting processes. Such a method may include the chronological steps of first attaching the existing electrical enclosure box 50 to a support surface, such as a wall frame.

A second step of the method may include providing a single and unitary body 120, 220, 320, 420, 520, 620, 720, 820, 920 and 1020 preferably having a substantially rectangular and planar outer wall 122, 222, 322, 422, 522, 622, 722, 822, 922 and 1022. The outer wall 122, 222, 322, 422, 522, 622, 722, 822, 922 and 1022 preferably has a plurality of coextensively shaped pins 124, 224, 324, 424, 524, 624, 724, 824, 924 and 1024 extending outwardly from an anterior face 126, 226, 326, 426, 526, 626, 726, 826, 926 and 1026 thereof. The pins 124, 224, 324, 424, 524, 624, 724, 824, 924 and 1024 may be statically situated at opposed corners of the anterior face 126, 226, 326, 426, 526, 626, 726, 826, 926 and 1026 The body 120, 220, 320, 420, 520, 620, 720, 820, 920 ad 1020 may further have a plurality of primary panels 128, 228, 328, 428, 528, 628, 728, 828, 928 and 1028 directly connected to a posterior face 130, 230, 330, 430, 530 and 630 of the outer wall 122, 222, 322, 422, 522, 622, 722, 822, 922 and 1022. The primary panels 128, 228, 328, 428, 528, 628, 728, 828, 928 and 1028 may extend rearwardly and away from the posterior face 130, 230, 330, 430, 530, 630, 730, 830, 930 and 1030. The outer wall 122, 222, 322, 422, 522, 622, 722, 822, 922 and 1022 may be provided with at least one opening 132, 232, 332, 432, 532, 632, 732, 832, 932 and 1032 formed therein.

A third step in the method may include detachably coupling the body 120, 220, 320, 420, 520, 620, 720, 820, 920 ad 1020 to the existing electrical connection enclosure box 50. This can be accomplished by frictionally engaging the primary panels 128, 228, 328, 428, 528, 628, 728, 828, 928 and 1028 to an interior surface of the existing electrical connection enclosure box 50 so that the outer wall 122, 222, 322, 422, 522, 622, 722, 822, 922 and 1022 covers an entire front opening 12 of the existing electrical enclosure box 50. This shields the front opening 12 of the existing electrical connection enclosure box 50 from undesirable debris and fluids.

A fourth step of the method may include providing and connecting a dry wall panel to the support surface 13 such that a posterior face 130, 230, 330, 430, 530, 630, 730, 830, 930 and 1030 of the drywall section abuts the pins 124, 224, 324, 424, 524, 624, 724, 824, 924 and 1024. Next, the user may use the pins 124, 224, 324, 424, 524, 624, 724, 824, 924 and 1024 to penetrate the posterior face of the dry wall section by firmly pressing the dry wall panel rearwardly towards the pins 124, 224, 324, 424, 524, 624, 724, 824, 924 and 1024 and the electrical connection enclosure box 50 respectively.

A sixth step of the method may include identifying a perimeter of the existing electrical connection enclosure box 50 by drawing a plurality of linear lines between the pins 124, 224, 324, 424, 524, 624, 724, 824, 924 and 1024 on the drywall panel. Next, the user may remove a cutout portion of the drywall panel that covers the outer wall 122, 222, 322, 422, 522, 622, 722, 822, 922 and 1022 by cutting the drywall panel along the linear lines.

An eighth step of the method may include texturing and painting a remaining portion of the drywall panel. Next, the user may detach the body 120, 220, 320, 420, 520, 620, 720, 820, 920 ad 1020 from the existing electrical connection enclosure box 50 by forwardly pulling the outer wall 122, 222, 322, 422, 522, 622, 722, 822, 922 and 1022 through the cutout portion of the drywall panel.

The method and apparatus of the present invention provide an unpredictable benefit of allowing a user to protect an existing electrical connection enclosure box 50 from debris caused by drywall, texturing and painting processes by providing a face plate that can be fitted over the opening. The invention also reduces the risk of electrical shock. The combination of such elements provides an unexpected result not rendered obvious by one skilled in the art because it reduces time and money for all trades involved with the aforementioned construction process.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An electrical connection enclosure cover plate for use during drywall installation, texturing and painting processes, said electrical connection enclosure cover plate comprising:

a single and unitary body having a substantially rectangular and planar outer wall adapted to be affixed to an existing electrical connection enclosure box, said outer wall having a plurality of pins extending outwardly from an anterior face thereof, said pins being statically situated at opposed corners of said anterior face and further being suitably sized and shaped for being adapted to penetrate through an existing dry wall, said body further having a plurality of primary panels directly connected to a posterior face of said outer wall, said primary panels extending rearwardly and away from said posterior face and further being adapted to frictionally engage the existing electrical connection enclosure box;

wherein said outer wall is provided with at least one opening formed therein for assisting a user to remove said body from the existing electrical connection enclosure box, said body being adapted to be detachably coupled to the existing electrical connection enclosure box such that said outer wall is adapted to cover and shield a front opening of the existing electrical connection enclosure box from undesirable debris and fluids;

wherein said primary panels are registered orthogonally to said posterior face of said outer wall, said outer wall having oppositely situated rectilinear edges registered parallel to longitudinal lengths of said primary panels respectively such that said primary panels extend along a major longitudinal length of said rectilinear edges;

wherein said body further includes a plurality of auxiliary panels directly connected to said posterior face of said outer wall such that said auxiliary panels extend rearwardly therefrom;

wherein said auxiliary panels are registered orthogonally to said posterior face and remain intermediately positioned between said primary panels respectively.

2. The electrical connection enclosure cover plate of claim 1, further comprising: a plurality of arcuately shaped members directly connected to axially opposed ends of said primary panels respectively for increasing a surface area against which said body is adapted to frictional engage the existing electrical connection enclosure box.

3. The electrical connection enclosure cover plate of claim 2, wherein said auxiliary panels have a curvilinear and oscillating shape configured in such a manner that said auxiliary panels further have axially opposed lateral ends directed coupled to said arcuately shaped members and thereby define a continuous frame inwardly offset along an outer perimeter of said posterior face.

4. The electrical connection enclosure cover plate of claim 3, wherein said arcuately shaped members are intermediately situated between said primary and auxiliary panels respectively such that said arcuate shaped members define opposing corners of said frame.

5. The electrical connection enclosure cover plate of claim 1, wherein said auxiliary panels are spaced apart along said rectilinear edges of said outer wall and further remain statically coupled to said posterior face of said outer wall.

6. A method for shielding an existing electrical connection enclosure box during drywall installation, texturing and painting processes, said method comprising the chronological steps of:
   a. attaching the existing electrical enclosure box to a support surface;
   b. providing a single and unitary body having a substantially rectangular and planar outer wall, said outer wall having a plurality of pins extending outwardly from an anterior face thereof, said pins being statically situated at opposed corners of said anterior face, said body further having a plurality of primary panels directly connected to a posterior face of said outer wall, said primary panels extending rearwardly and away from said posterior face, said outer wall being provided with at least one opening formed therein; and
   c. detachably coupling said body to the existing electrical connection enclosure box by frictionally engaging said primary panels to the existing electrical connection enclosure box so that said outer wall covers an entire front opening of the existing electrical enclosure box and thereby shields the front opening of the existing electrical connection enclosure box from undesirable debris and fluids;
      wherein said primary panels are registered orthogonally to said posterior face of said outer wall, said outer wall having oppositely situated rectilinear edges registered parallel to longitudinal lengths of said primary panels respectively such that said primary panels extend along a major longitudinal length of said rectilinear edges;
      wherein said body further includes a plurality of auxiliary panels directly connected to said posterior face of said outer wall such that said auxiliary panels extend rearwardly therefrom;
      wherein said auxiliary panels are registered orthogonally to said posterior face and remain intermediately positioned between said primary panels respectively.

7. The method of claim 6, further comprising the chronological steps of:
   d. providing and connecting a dry wall section to the support surface such that a posterior face of the drywall section abuts said pins;
   e. forwardly penetrating said pins from the posterior face of the dry wall section by firmly pressing the dry wall section rearwardly towards said pins and the electrical connection enclosure box respectively;
   f. identifying a perimeter of the existing electrical connection enclosure box by drawing a plurality of linear lines between said pins on the drywall section; and
   g. removing a cutout portion of the drywall section that covers said outer wall by cutting the drywall section along the linear lines.

8. The method of claim 7, further comprising the chronological steps of:
   h. texturing and painting a remaining portion of the drywall section; and
   i. detaching said body from the existing electrical connection enclosure box by forwardly pulling said outer wall through the cutout portion of the drywall section.

9. A method for shielding an existing electrical connection enclosure box during drywall installation, texturing and painting processes, said method comprising the chronological steps of:
   a. attaching the existing electrical enclosure box to a support surface;
   b. providing a single and unitary body having a substantially rectangular and planar outer wall, said outer wall having a plurality of coextensively shaped pins extending outwardly from an anterior face thereof, said pins being statically situated at opposed corners of said anterior face, said body further having a plurality of primary panels directly connected to a posterior face of said outer wall, said primary panels extending rearwardly and away from said posterior face, said outer wall being provided with at least one opening formed therein; and
   c. detachably coupling said body to the existing electrical connection enclosure box by frictionally engaging said primary panels to an interior surface of the existing electrical connection enclosure box so that said outer wall covers an entire front opening of the existing electrical enclosure box and thereby shields the front opening of the existing electrical connection enclosure box from undesirable debris and fluids;
      wherein said primary panels are registered orthogonally to said posterior face of said outer wall, said outer wall having oppositely situated rectilinear edges registered parallel to longitudinal lengths of said primary panels respectively such that said primary panels extend along a major longitudinal length of said rectilinear edges;
      wherein said body further includes a plurality of auxiliary panels directly connected to said posterior face of said outer wall such that said auxiliary panels extend rearwardly therefrom;

wherein said auxiliary panels are registered orthogonally to said posterior face and remain intermediately positioned between said primary panels respectively.

10. The method of claim 9, further comprising the chronological steps of:
- d. providing and connecting a dry wall section to the support surface such that a posterior face of the drywall section abuts said pins;
- e. forwardly penetrating said pins from the posterior face of the dry wall section by firmly pressing the dry wall section rearwardly towards said pins and the electrical connection enclosure box respectively;
- f. identifying a perimeter of the existing electrical connection enclosure box by drawing a plurality of linear lines between said pins on the drywall section; and
- g. removing a cutout portion of the drywall section that covers said outer wall by cutting the drywall section along the linear lines.

11. The method of claim 10, further comprising the chronological steps of:
- h. texturing and painting a remaining portion of the drywall section; and
- i. detaching said body from the existing electrical connection enclosure box by forwardly pulling said outer wall through the cutout portion of the drywall section.

\* \* \* \* \*